US005802314A

United States Patent [19]
Tullis et al.

[11] Patent Number: 5,802,314
[45] Date of Patent: Sep. 1, 1998

[54] METHOD AND APPARATUS FOR SENDING AND RECEIVING MULTIMEDIA MESSAGES

[75] Inventors: Thomas S. Tullis, Laguna Niguel; Loren A. Wood, Lakewood; James A. Fontana, Mission Viejo, all of Calif.

[73] Assignee: Canon Kabushiki Kaisha, Tokyo, Japan

[21] Appl. No.: 461,759

[22] Filed: Jun. 5, 1995

Related U.S. Application Data

[63] Continuation of Ser. No. 808,757, Dec. 17, 1991, abandoned.

[51] Int. Cl.$^6$ .................................................. G06F 13/00
[52] U.S. Cl. .......................... 395/200.76; 379/93.15; 379/100.13
[58] Field of Search .................. 395/154, 200.31, 395/200.76; 379/88, 89, 93.15, 100.13

[56] References Cited

U.S. PATENT DOCUMENTS

| | | | |
|---|---|---|---|
| 4,766,548 | 8/1988 | Cedrone et al. | 364/479 |
| 4,769,833 | 9/1988 | Farleigh et al. | 379/105 |
| 4,787,028 | 11/1988 | Finfrock et al. | 395/285 |
| 4,821,312 | 4/1989 | Horton et al. | 379/102 |
| 4,852,154 | 7/1989 | Lewis et al. | 379/105 |
| 4,872,195 | 10/1989 | Leonard | 379/40 |
| 4,902,881 | 2/1990 | Janku | 235/381 |
| 4,974,254 | 11/1990 | Perine et al. | 379/100 |
| 4,996,707 | 2/1991 | O'Malley et al. | 379/100 |
| 4,998,248 | 3/1991 | Matsuzaki | 370/110.1 |
| 5,008,926 | 4/1991 | Misholi | 379/94 |
| 5,146,488 | 9/1992 | Okada et al. | 379/88 |
| 5,150,357 | 9/1992 | Hoper et al. | 370/68.1 |
| 5,303,343 | 4/1994 | Ohya et al. | 395/800 |

FOREIGN PATENT DOCUMENTS

91/03115  3/1991  WIPO .

OTHER PUBLICATIONS

Thomas et al., "Diamond: A Multimedia Message System Built on a Distributed Architecture," *Computer*, IEEE, Dec. 1985, pp. 65–78.

Zellweger et al., "An Overview of the Etherphone System and Its Applications," *Proceedings of the 2nd IEEE Conference on Computer Workstations*, 7–10 Mar. 1988, pp. 160–168.

Flinchbaugh et al., "Network Capabilities in Support of Multimedia Applications," *GLOBECOM 90: IEEE Global Telecommunications Conference and Exhibition*, Dec. 2–5, 1990, pp. 322–326, vol. 1.

J. Hares, "Post Relational Technology: Multi-Media Databases," *IEE Colloquium on Large Databases in Press and Publishing: The Present and the Future*, (Digest No. 101), Jun. 12, 1990, pp. 3/1–3/6.

*Primary Examiner*—William M. Treat
*Attorney, Agent, or Firm*—Fitzpatrick, Cella, Harper & Scinto

[57] ABSTRACT

A multimedia message handling apparatus comprises a keyboard for inputting text information, a microphone for inputting voice information, a scanner for inputting image information, and binary means for inputting binary information. A processor is provided for mixing at least two of text information, voice information, image information, binary information and OLE information to generate a multimedia message in which the different types of information are separately identifiable. A memory stores the generated multimedia message. The multimedia message handling apparatus further includes a facsimile interface for sending and receiving image information through a telephone interface, a voice synthesizer/digitizer for sending and receiving voice information through the telephone interface, a modem for sending and receiving image information, text information, voice information and binary information through the telephone interface, and a network control unit for selectively connecting the telephone interface to the facsimile interface, the voice synthesizer/digitizer, or the modem in accordance with message characteristics on the telephone interface. Multimedia messages received by the apparatus are stored in the memory where they may be viewed or otherwise processed.

320 Claims, 19 Drawing Sheets

METHOD AND APPARATUS FOR SENDING AND RECEIVING MULTIMEDIA MESSAGES

This application is a continuation of application Ser. No. 07/808,757 filed Dec. 17, 1991 now abandoned.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

This application is being filed with a microfiche appendix of a computer program listing. The microfiche appendix comprises four (4) microfiche which include 194 frames.

1. Field of the Invention

The present invention pertains to a method and apparatus for processing messages which may have image, audio, text and other types of information mixed in a single message, for example, a message that includes mixed voice information, image information (color or otherwise) text information and binary information. The present invention also relates to a method and apparatus for creating, editing and displaying such messages in a multimedia environment, and for electronically sending and receiving such messages via different transmission devices including facsimile, voice telephone and modem.

2. Description of the Related Art

Recently, it has become possible to provide automated office equipment with the capability to create, to send and to receive different types of messages such as voice messages, image messages (color and otherwise), text messages and binary messages. It has also become possible to provide such automated office equipment with different types of transmission/reception devices such as facsimile, voice telephone and modem.

For example, currently available automated office equipment contains a computer, a facsimile, a voice telephone and a modem collected together in one device. The computer is provided with operational software that enables the device to send and receive facsimile messages via the facsimile, to send and receive voice messages via the voice telephone, and to send and receive an image message, a text message or a binary message via the modem.

Despite these advances, currently available automated office equipment is not able to send and receive a single message containing mixed types of information such that the different types of information are separately identifiable. For example, while currently available equipment is able first to send an image message and then to send a text message, it is not able to send a single mixed message that includes both an image part and a text part in a manner that allows equipment which receives the message automatically to identify the parts, to separate them, and to display them to the recipient while preserving the image part as image information and the text part as text information. Instead, conventional equipment is unable automatically to decipher a single message having mixed types of information.

Currently available equipment is further not able automatically to process different types of information from different sources so as to create a single message containing mixed types of information. Thus, for example, while currently available equipment is able first to process image information from a scanner to create a facsimile message and then to process text information from a keyboard to create a text message, currently available equipment is not able to process both types of information automatically to create a single mixed media message. As such, conventional equipment is unable to manipulate, edit or display such messages.

SUMMARY OF THE INVENTION

The present invention addresses these drawbacks through the provision of a method and apparatus for creating and processing messages whose parts include differing types of information mixed together in a single message (hereinafter a "multimedia message"). The differing types of information include, for example, voice, image (color or otherwise), text and binary types of information, as well as link information to data in other application programs (hereinafter "object linking and embedding" links or "OLE" links). The method and apparatus of the present invention is capable of sending and receiving multimedia messages by any one of a variety of transmission devices such as facsimile, voice telephone, modem (for example, electronic mail), or local area network server ("LAN").

According to the invention, these capabilities are achieved through the provision of a method and apparatus for processing multimedia messages in each multimedia message is handled in a uniform way regardless of the type of information it contains. Conversion from one information type to another information type, for example, text to speech-synthesized voice, is also provided.

The invention further provides the capability of receiving multimedia messages from one transmission device and reformatting such messages so that they are suitable for transmission over another transmission device.

Multimedia message handling equipment according to the present invention can include the capability of searching a message database that contains information about all messages sent and received, including recipient and sender information, subject information and date and time information. Various message folders are provided to allow a user to define and to organize messages. The equipment provides for a group-addressing capability wherein a single multimedia message can be sent to several different recipients, potentially using several different transmission devices. Thus, for example, one recipient may be sent a multimedia message by facsimile, a second recipient may be sent the same multimedia message by modem, and a third recipient may be sent the same multimedia message by voice telephone.

Multimedia message handling equipment according to the present invention can further provide the capability of scheduling message transmission whereby messages can be scheduled for delivery at any desired time or in any desired sequence. The user is provided with a database which contains all address information on individuals with whom the user communicates and which contains all pertinent information concerning those individuals, for example, a voice telephone number, a facsimile transmission number, an electronic mail address, etc.

The multimedia message handling equipment can also include character recognition capability for converting, for example, a message's image part into ASCII text in the case where the image data is a text image. Further conversion capabilities are provided for converting a message's text part into synthesized speech for allowing transmission of text by voice telephone. The text may be received directly as a text file or converted from a text image through the character recognition capability. The message handling equipment can further include the capability of previewing the results of conversion, thereby permitting a user to preview the results of, for example, a text-to-facsimile or text-to-speech conversion, before the converted message is transmitted.

In addition, the multimedia message handling equipment can provide the capability for remote access, for example, by a host computer through a modem interface or by a voice telephone line using a combination of speech recognition and DTMF telephone keypad detection. Thus, for example, this capability allows a user to listen to voice messages (or messages convertible to voice messages), to create new voice messages, and, using image-to-text conversion and/or text-to-speech conversion, to listen to facsimile or text messages. Polling is also possible, whereby the message handling equipment may be polled to retrieve selected messages stored therein.

The multimedia message handling equipment can also provide the capability through an interface port for use in connection with other equipment, for example, a host computer having information processing capabilities such as word processing and spreadsheet processing capabilities, and for interoperability with such a host computer, such as to exchange or process information via a clipboard or to provide links to data in other application programs running on the host computer via OLE links.

In one aspect, the invention is a method and apparatus for processing first type information and second type information different from the first type, in which the first type information and the second type information are mixed to generate a multimedia message such that the first type information and the second type information are separately identifiable. The multimedia message may include header information as well as one or more pages of mixed information, each page having map information which identifies the mixed types of information on the page and link information to other pages. The multimedia message may be transmitted and conversions performed on the various types of information therein. The multimedia message may be displayed in multimedia format, and the displayed message may be edited.

In another aspect, the invention is a method and apparatus for handling a stored multimedia message which includes at least one page having first type information mixed with second type information different from the first type information such that the first and second types are separately identifiable, and in which the stored multimedia message is transmitted to a telephone interface. The information in the multimedia message may be converted from one type information to another, and remote access to the message handling capabilities may be provided. Various input means may be provided to input the different types of information, and the multimedia message may include header information as well as map information which identifies the mixed types of information on the page and link information to other pages. The multimedia message may be displayed in multimedia format and the displayed message may be edited.

In another aspect, the invention is a method and apparatus for sending and receiving multimedia messages in which first and second types of information are input, the first and second types of information are mixed to generate a multimedia message such that the first and second types of information are separately identifiable, the multimedia message is stored in a folder, and the stored multimedia message is transmitted to a telephone interface. Multimedia messages may also be received from the telephone interface and stored. The multimedia message may include header information as well as one or more pages, each page having map information which identifies the mixed types of information on the page and link information to other pages. The information in the multimedia message may be converted from one type of information to another, and remote access to the message handling capabilities may be provided. The multimedia message may be displayed in multimedia format and the displayed message may be edited. Transmission of a multimedia message may be scheduled, and coordination of various transmission means for sending and receiving multimedia messages may be provided by a network control unit.

In another aspect, the invention is a method and apparatus for handling multimedia messages in which a keyboard inputs text information, a microphone inputs voice information, a scanner inputs image information, and binary means inputs binary information. The text information, voice information, image information, binary and OLE information may be mixed to generate a multimedia message such that the different types of information are separately identifiable, and the multimedia message so generated is stored. Image information is sent and received via a facsimile interface, voice information is sent and received via a voice synthesizer/digitizer, and image information, text information, voice information, binary information and multimedia messages are sent and received via a modem. Multimedia messages received from the modem are stored, and the facsimile interface, the voice synthesizer/digitizer and the modem are controlled in accordance with message characteristics on the telephone interface by a network control unit. The multimedia message may include header information as well as one or more pages, each page having link information to other pages and map information which identifies the mixed types of information on the page. Conversion may be provided from one type of information to another and remote access to the message handling capabilities may be provided. The multimedia message may be displayed in a multimedia format and the displayed message may be edited.

This brief summary has been provided so that the nature of the invention may be understood quickly. A more complete understanding of the invention can be obtained by reference to the following detailed description of the preferred embodiment thereof in connection with the drawings which together form a complete part of the specification.

DETAILED DESCRIPTION OF THE PREFERRED EMBODIMENT

The present invention can be implemented in a variety of devices where multimedia message handling capabilities are desired. Stand-alone equipment is described below in which the message handling equipment is fully integrated and includes all components needed to provide multimedia message handling capability. However, the message handling system of the present invention can be implemented in other forms of equipment, for example equipment having discrete components or information processing equipment that includes other information processing capabilities such as word processing and spreadsheet processing. In this latter case, the message handling system of the invention interacts with such other information processing capabilities such as to exchange information and/or messages. For example, it is possible to export information from the message handling system for processing by the information processing equipment and to import information from the information processing equipment into the message handling system to create and/or transmit messages from the information.

Figure 1A:
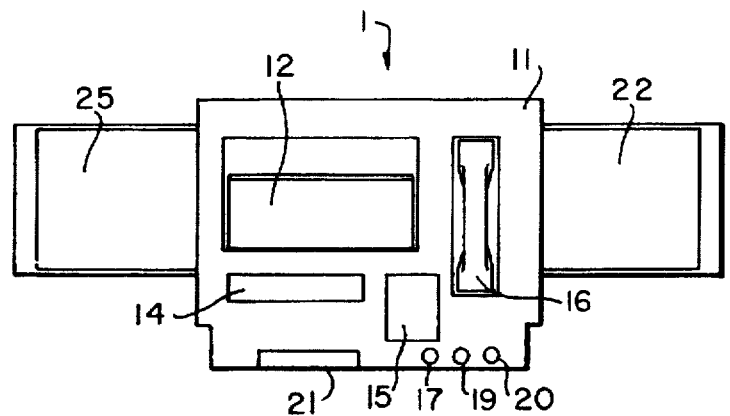
FIGS. 1A, 1B and 1C are views showing the external appearance of an exemplary embodiment of a multimedia message handling equipment according to the invention.
Figure 1B:
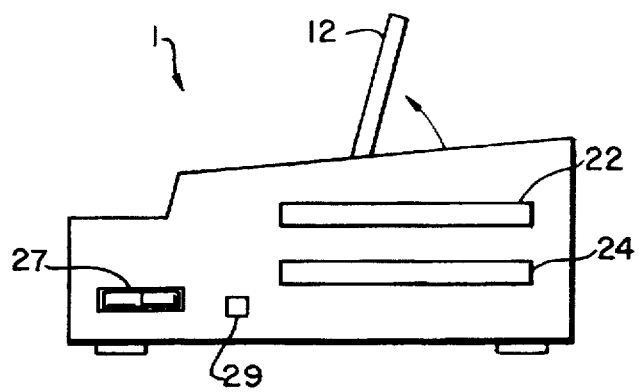
Figure 1C:
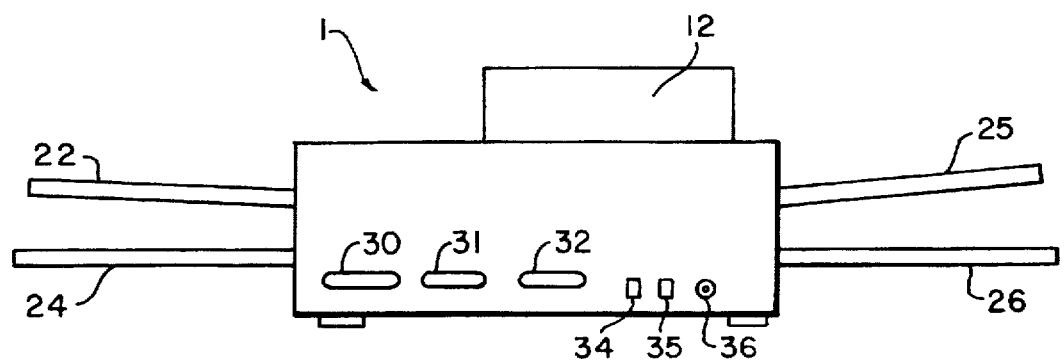

FIGS. 1A through 1C are views for showing the physical appearance of an integrated, stand-alone device embodying the present invention. As shown in FIG. 1A, the device 1 includes a housing 11 on which is mounted a pen-capable touch sensitive display screen 12. Display screen 12 is mounted on unshown slide tracks and may be detached from the device for lap-top operation. Alternatively, the display screen may be tilted upward for desk-top operation.

The touch sensitive display screen is the primary user interface with the message handling system and allows the device to display control menus from which the user controls the device by touching appropriate portions on the displayed control menu. Likewise, touch sensitive display screen 12 displays the visually perceptible parts of a multimedia message, such as an image part (color or otherwise), a text part or a binary part. For non-visually perceptible parts such as voice or link information, icons are displayed.

Control buttons 14 are further provided to permit the user immediate control over the message handling system, such as an enter button, a cancel button or an escape button.

A telephone keypad is provided at 15 and allows the user to dial telephone numbers and to access systems through DTMF telephone identification handling systems. Telephone handset 16 provides the capability for voice communication either through normal telephone voice communication channels or by communication with another message handling system 1. Microphone 17, speaker 19 and audio jack 20 provide auxiliary aural communication capabilities.

Figure 2:
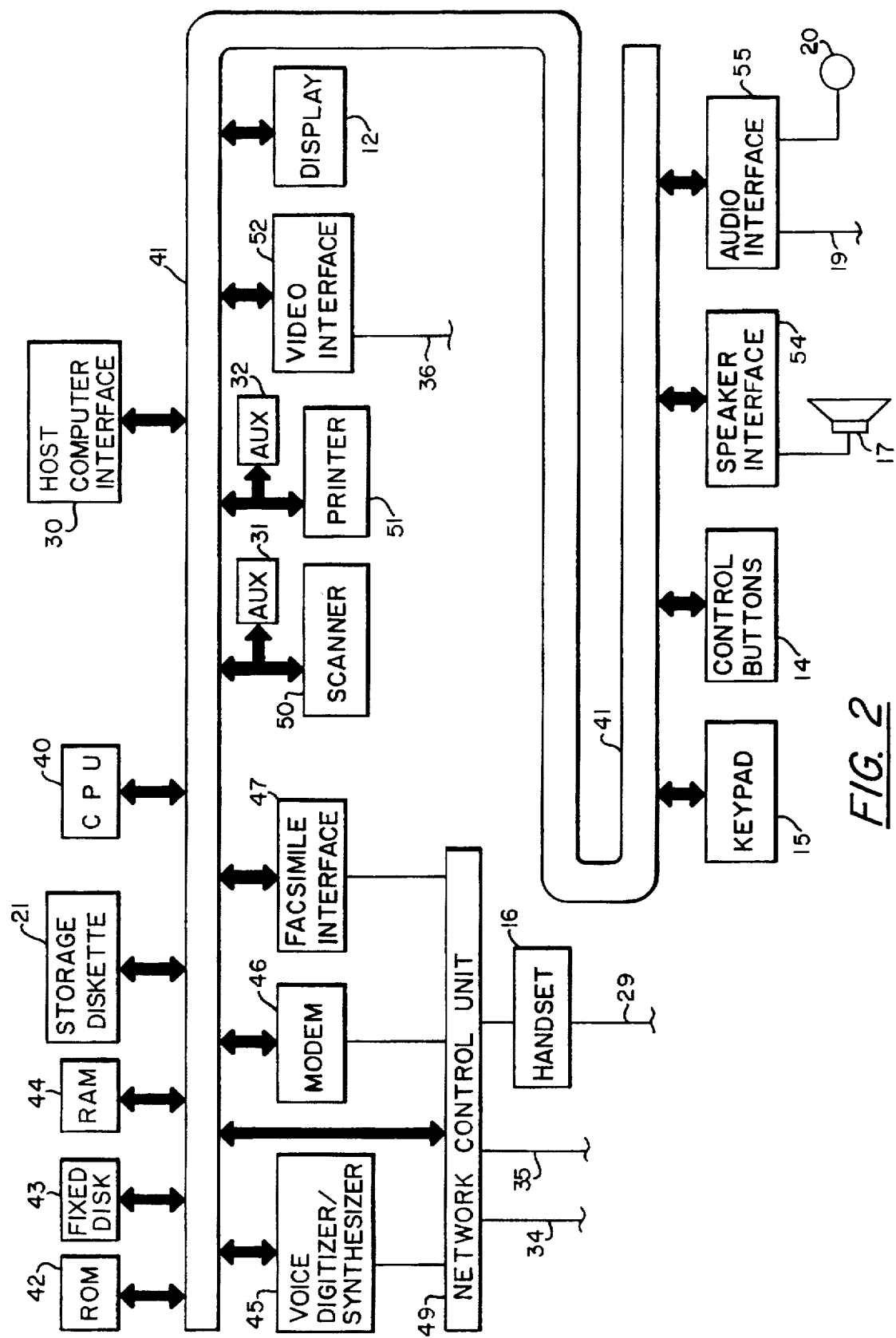
FIG. 2 is a block diagram of the FIG. 1 embodiment.

Primary mass storage is provided by an unshown fixed magnetic disk (see 43 in FIG. 2). Additional mass storage capability in the form of a removable diskette is provided at 21. Any mass storage capability, such as a tape drive, may be substituted for or included in addition to the diskette shown at 21.

Printer input tray 22 is provided for storing a stack of paper for an internal printer. The internal printer feeds a sheet of paper from printer input tray 22, prints the desired information on the sheet, and discharges the printed sheet to printer output tray 24 (see FIG. 1B).

Scanner input tray 25 is provided for holding original documents to be scanned by an internal scanner. The internal scanner feeds original documents from scanner input tray 25, scans the original image to convert it to a digital pixel image in accordance with conventional technology, and discharges the original document to an output tray 26.

FIG. 1B is a side view of the multimedia message handling equipment. FIG. 1B shows power switch 27 and auxiliary telephone jack 29. Telephone jack 29 allows connection to an auxiliary telephone and telephone handset. In FIG. 1B, pen-capable touch sensitive screen 12 is shown in its upwardly tilted orientation.

FIG. 1C shows a back view of the message handling equipment. As shown in FIG. 1C, the equipment is provided with interface port 30, such as a bi-direction parallel port or an SCSI port, for interface with a host computer. Such an interface permits the multimedia message handling equipment to operate in conjunction with a host computer and allows a host computer to access the multimedia message information stored in the multimedia message handling equipment. Thus, for example, port 30 permits the multimedia message handling equipment to access the information processing capabilities resident in a host computer and to permit interaction with the host computer. Conversely, of course, port 30 permits a host computer to access the message handling capabilities of the multimedia message handling equipment 1 in connection with the host computer information processing capabilities.

Further shown in FIG. 1C are auxiliary printer port 31 and auxiliary scanner port 32. Such ports provide the capability of connecting auxiliary equipment to the message handling equipment 1 so as to provide additional printing and scanning capabilities.

Two telephone jacks 34 and 35 give the multimedia message handling equipment 1 access to two different telephone lines. Each of the telephone jacks 34 and 35 is connected to a network control unit (see FIG. 2) which automatically detects the presence on the telephone lines of a facsimile transmission, a data transmission or a voice communication, and connects the telephone line to an appropriate transmission device, as described more fully below in connection with FIG. 2.

Input terminal 36 accepts video images which may be still video or motion pictures in analog form, namely NTSC composite video form. The video image is captured and digitized.

FIG. 2 is a block diagram of the FIG. 1 apparatus. Elements described above in connection with FIG. 1 have been assigned the same reference numerals.

In FIG. 2, a central processing unit ("CPU") 40, such as an Intel 80386 or other programmable microprocessor, is connected to a data bus 41. A read only memory ("ROM") 42, a fixed disk 43 and random access memory ("RAM") 44 are also connected to data bus 41. ROM 42 is provided to store process steps for execution by CPU 40, and RAM 44 is provided for storing data processed by CPU 40 in accordance with the process steps stored in ROM 42. CPU 40 is also capable of performing process steps that are stored in RAM 44, and in certain situations it may be preferable for CPU 40 to operate in this manner.

RAM 44 is shown as a single block in FIG. 2 for convenience only. RAM 44 may, in fact, consist of several physical devices and preferably includes at least one portion of non-volatile memory. The non-volatile portion of RAM is useful for maintaining the integrity of data in the event that power is lost or the power switch 27 is deactivated. Non-volatile RAM may be used for storing multimedia messages although it is preferred to store such messages on the fixed disk 43.

Further connected to data bus 41 are voice digitizer/synthesizer 45, modem 46, facsimile interface 47, and network control unit ("NCU") 49. In the case of message reception, NCU 49 automatically detects whether the active telephone line 34 or 35 is carrying a facsimile transmission, a data transmission, or a voice communication. In accordance with the detection, the network control unit activates the appropriate one of the voice digitizer/synthesizer 45, the modem 46 or the facsimile interface 47 and directs the active telephone line to the appropriate device.

In the case of message transmission, NCU 49, under the control of CPU 40, selects and activates (goes off-hook) the appropriate telephone line 34 or 35, and dials the desired telephone number. Under the control of CPU 40 and in accordance with the desired transmission device, NCU 49 then selects one of the voice digitizer/synthesizer 45, the modem 46 or the facsimile interface 47, and connects the activated telephone line to the selected device.

Thus, network control unit 49 provides an interface between the multimedia message handling equipment 1 and the telephone lines by any one of three different devices: voice telephone, modem, or facsimile. In the event that handset 16 (or an auxiliary telephone on line 29) is activated by the user, network control unit 49 automatically senses such activation and gives the user access to an unused telephone line for the purposes of ordinary telephone communication.

Also connected to data bus 41 are scanner 50 and printer 51. These devices are well known to those skilled in the art and have been described above in connection with FIG. 1.

Video interface 52, speaker interface 54 and audio interface 55 are further connected to data bus 41. These conventional devices provide appropriate interface between data bus 41 and respective ones of the video input 36, speaker 17 and audio jack 19 and microphone 20.

FIG. 3A shows the organization by which CPU 40 stores multimedia messages in RAM 44 and/or internal fixed disk 43. As shown in FIG. 3A, multimedia messages are separated into different folders, a representative one of which is shown at 61. The multimedia message handling system automatically provides for one folder, and the user can define other folders such as an "in box" folder for storing unread multimedia messages that have been received by the message handling system through various transmission devices, a "pending" folder for storing multimedia messages that have been read but otherwise not disposed of, and a "scheduled" folder for storing multimedia messages that have been scheduled for transmission but have not yet been transmitted.

FIG. 3A shows a representative folder at 61 which is designated as folder #X. Folder #X may, for example, be the "in box" folder. As shown in FIG. 3A, folder #X contains plural multimedia messages 62 which are labeled multimedia message #1, #2, #3, etc.

As further shown in FIG. 3A, each multimedia message, for example, message #Y, is comprised of a header block 64 of information concerning the multimedia message followed by one or more pages 65 of message data. As shown in FIG. 3A, the header block 64 contains information concerning the sender of the multimedia message, the recipient of the multimedia message, the transmission device by which the multimedia message was or will be sent (for example, facsimile, modem, or voice telephone), the telephone number associated with the transmission device, the date and time of the multimedia message, and the number of pages included in the multimedia message. In addition, status information is provided, such as "read", "unread" or "scheduled".

Each page of the multimedia message contains different types of information mixed together but stored such that the different types of information are separately identifiable. FIG. 3B shows how a typical page in a multimedia message is displayed in multimedia format on display 12, and FIG. 3A shows the organization by which the page is stored.

As shown in FIG. 3B, a typical page may include any of several different types of information including text information, image information (color or otherwise), voice information, binary information, and OLE links. When a display is displayed on display 12, every type of information has a visually perceptible object that represents the type of information. For text, image and OLE information, the object is the actual text, image or data represented by the information. For voice and binary information, a special icon is displayed. Thus, as shown in FIG. 3B, a typical page displayed on display 12 may include text information represented by text object 70 which is an image of the text itself, image information represented by image object 71 which is a visual presentation of the image, voice information which is represented by a voice icon 72, binary information which is represented by a binary icon 73, and OLE links which is represented by OLE object 74. An OLE link is a link to data generated by another software program. The object for an OLE link is the actual data so generated, for example, spreadsheet data, image data generated by a painting program, or word processed text. At the time a multimedia message containing an OLE link is transmitted, the link is updated and the actual data currently generated by the other application software is sent in the form of another type of information as appropriate to the OLE link (i.e., text information, image information, voice information or binary information, as appropriate). Thus, in a recipient's machine, the information in an OLE link is no longer an OLE link but is replaced by another information type as described above.

FIG. 3A shows the organization by which a page of data in a multimedia message is stored. As shown in FIG. 3A, page information includes page number information, links to other pages in the multimedia message, the physical size of the page and the number of objects on the page. The page further includes map information for the objects. Specifically, for each object, the type of information in the object is specified (e.g., text information, image information, voice information, binary information or OLE link), the location of the object on the page is specified, and the contents of the object is specified.

Thus, in accordance with the organization shown in FIG. 3A, each multimedia message, regardless of the types of information for the pages in the multimedia message, is stored in a common format. Specifically, each page of the multimedia message is organized the same as each other page in the message regardless of the information types in the page, each multimedia message is organized the same as each other multimedia message in the folder regardless of the transmission device for the multimedia message, and each folder in the message handling system is organized the same as each other folder. Accordingly, it is possible for the multimedia message handling system of the present invention automatically to identify and separate the different parts of the multimedia message and automatically to preserve the integrity of each part as a particular type of message.

Figure 4:
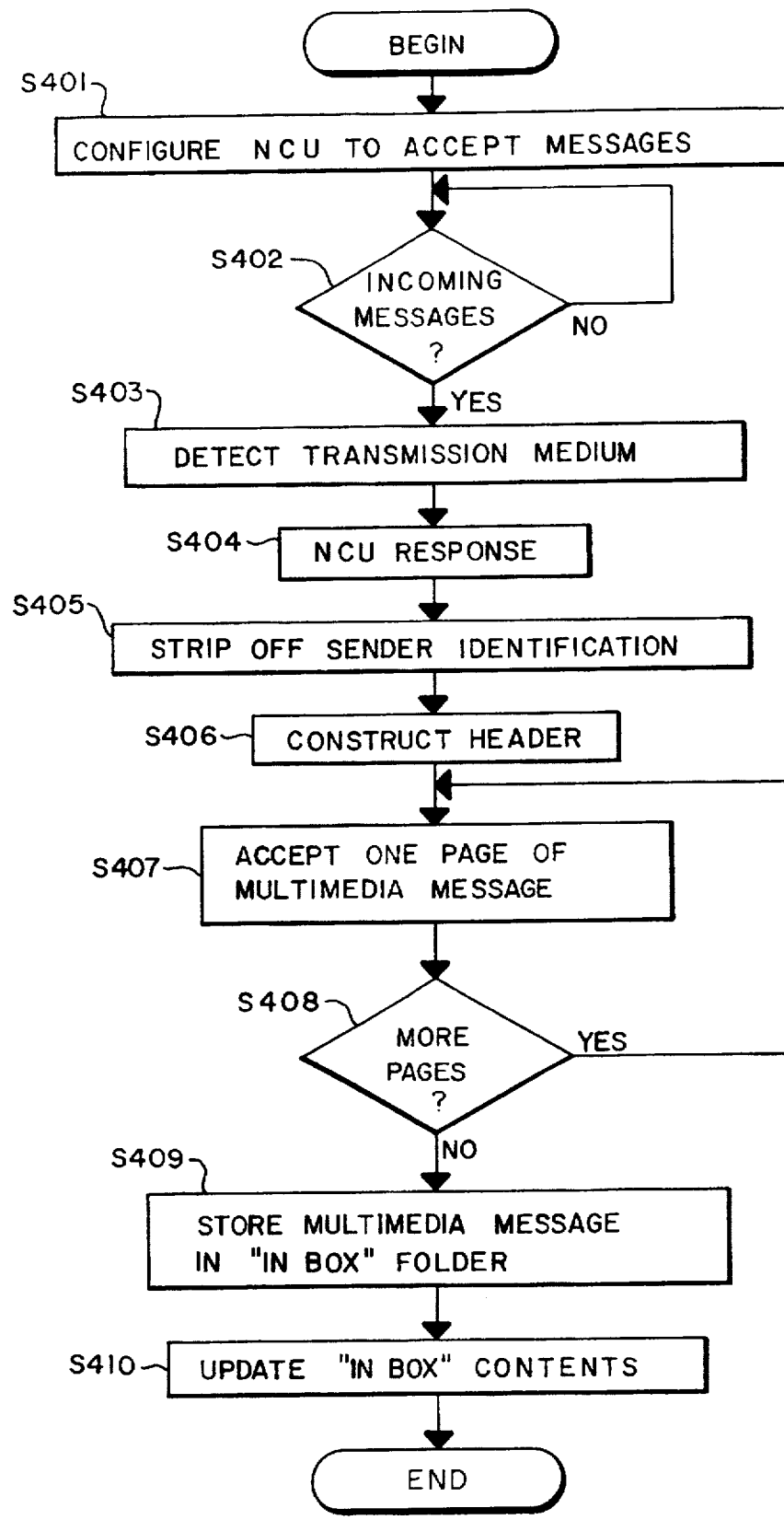
FIGS. 4, 5, 6, 7, 8, 9, 10, 11, 12, 13A, 13B, 14A, 14B, 15A, 15B, and 15C are flow diagrams for explaining the operation of the FIG. 1 embodiment.

FIG. 4 is a flow diagram illustrating the method by which the message handling equipment of the present invention receives and stores incoming multimedia messages. The process steps depicted in FIG. 4 are embodied in a computer program stored in ROM 42 and are executed by CPU 40. (A representative computer program, written in the C++ programming language, is given in the microfiche appendix to this application.) Preferably, CPU 40 executes the process steps of FIG. 4 at repetitively scheduled intervals, for example, as a so-called "background task." As shown in FIG. 4, CPU 40 configures NCU 49 to detect incoming messages over either one of telephone lines 34 or 35 (step S401). In step S402, NCU 49 idles while determining whether an incoming message is being received. If in step S402, NCU 49 detects that an incoming message is being received over one of telephone lines 34 or 35, NCU 49 goes off hook and detects in step S403 the transmission medium of the incoming message, that is, whether the transmission medium is a voice message, a modem-transmitted message or a facsimile-transmitted message. In step S404, the NCU responds to the detected medium by activating the appropriate one of the voice digitizer/synthesizer 45, the modem 46 or the facsimile interface 47. Specifically, if the incoming message is being transmitted by a voice medium, the NCU activates the voice digitizer/synthesizer 45 so that it converts incoming voice messages into digital format voice information for storage by CPU 40 on disk 43 or other memory. In the case that the transmission medium is a modem, NCU 49 activates modem 46 to accept the modem-transmitted message. Modem-transmitted messages may be text information, image information, binary information or a multimedia message being transmitted by a complementary message handling device according to the invention. Finally, if the transmission medium is a facsimile medium, NCU 49 activates the facsimile interface 47 enabling CPU 40 to store facsimile-transmitted image information.

In step S405, CPU 40 strips off sender identification information, for example, from automatic number identification system provided by the telephone company in conjunction with the telephone communication, or by receiving and detecting sender identification data transmitted by the sender as part of the message. In step S406, CPU 40 constructs header information for the message being received. In particular, if the message being received is not a multimedia message transmitted by a complementary message handling device, the CPU 40 assembles the sender information, inserts recipient information, stores the transmission device (i.e., facsimile, voice telephone or modem), the telephone number and identification of the transmission device, the date and time of message, the number of pages (if available), and assigns an "unread" status. If the message being received is a multimedia message transmitted from a complementary message handling device, then header information is transmitted as part of the message, and no special steps need to be taken to construct the header.

In step S407, CPU 40 accepts the first page of the message. If the sender is a complementary multimedia message handling system according to the present invention, then the first page of the multimedia message is organized as shown in FIG. 3A. In that case, CPU 40 simply stores the multimedia message in the transmitted format. On the other hand, if the sender is not a multimedia message handling system according to the invention, then CPU 40 creates a new page by inserting the page number, the information type, a link to the immediately preceding page and a link to an immediately succeeding page. CPU 40 accepts the page contents, for example, a voice, image, facsimile, text or binary message, and stores the same, together with the page header, in RAM 44 or fixed disk 43.

In step S408, CPU 40 determines whether additional pages of multimedia message are being transmitted. If there are additional pages, CPU 40 returns to step S407 and executes the appropriate steps. If, on the other hand, there are no additional pages, CPU 40 updates the header information to reflect the number of pages actually received, deposits the newly-received multimedia message in the "in box" folder and updates the "in box" contents appropriately (step S410).

The newly received multimedia message may be displayed and edited and retransmitted from the multimedia message handling equipment. In addition, multimedia messages may be created by the equipment, and these messages may be displayed and edited and transmitted as well. FIGS. 5 through 14 are flow charts for explaining these aspects of operation. The processes depicted in these figures are executed by CPU 40 in accordance with process steps stored in a computer program stored in ROM 42 or RAM 44, as the case may be. A representative computer program, written in the Visual Basic programming language (available from Microsoft Corporation), together with screen dumps from execution of the program, is provided on the microfiche appendix to this specification.

Figure 5:
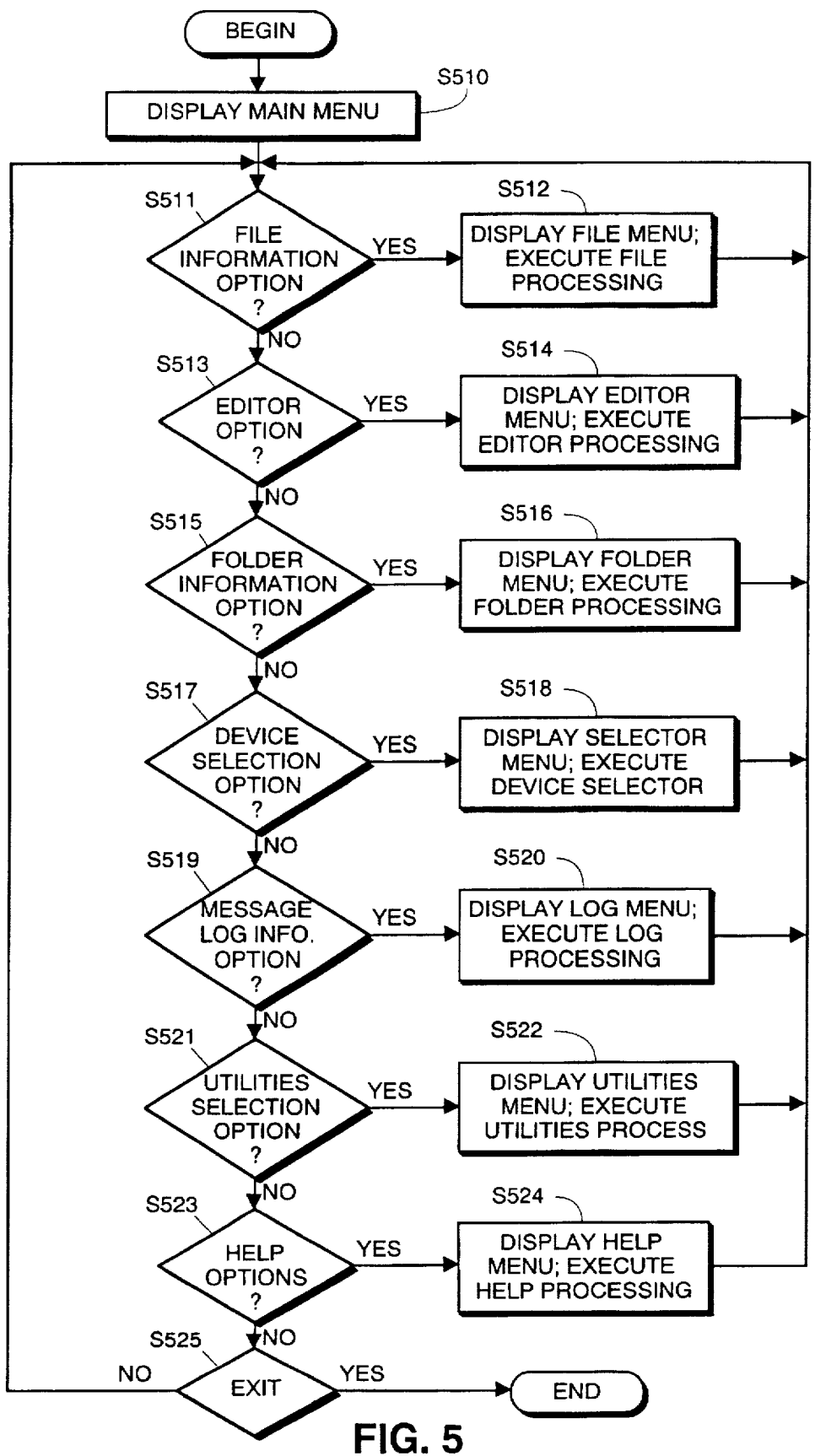

FIG. 5 depicts the flow chart for a main menu that is displayed to the user by CPU 40 on display 12 as shown in step S510.

As shown in step S511, if the user selects a file information option, CPU 40 displays on display 12 the "file" menu and executed file processing as described more fully below in connection with FIG. 6. If the user does not select the file information option in step S511, but selects an editor option in step S513, then CPU 40 displays an "editor" menu on display 12 and executes editor processing as shown in step S514 and described more fully below in connection with FIG. 7. If the user does not select the editor option in step S514, but selects the folder information option in step S515, then CPU 40 displays the "folder" menu on display 12 and executes folder processing as shown in step S516 and described more fully below in connection with FIG. 8. If the user does not select the folder information option in step S515 but selects a device selection option in step S517, then the CPU 40 displays the "selector" menu on display 12 and executes device selection processing as shown in step S518 and described more fully below in connection with FIG. 9. If the user does not select the device selection option in step S517 but selects the message log information option in step S519, then CPU 40 displays the "log" menu on display 12 and executes message log processing as shown in step S520 and described more fully below in connection with FIG. 10. If the user does not select the message log information option in step S519 but selects a utilities selection option in step S521, then the CPU 40 displays the "utilities" menu on display 12 and executes utilities processing as shown in step S522 and described more fully below in connection with FIG. 11. If the user does not select the utilities selection option in step S521 but selects a help option in step S523, then the CPU 40 displays the "help" menu on display 12 and executes help processing as shown in step S524. If the user does not select the help option in step S523 but selects an exit option in step S525, then the program terminates. If the user does not select the exit option, then the processing flow returns to step S511.

Figure 6:
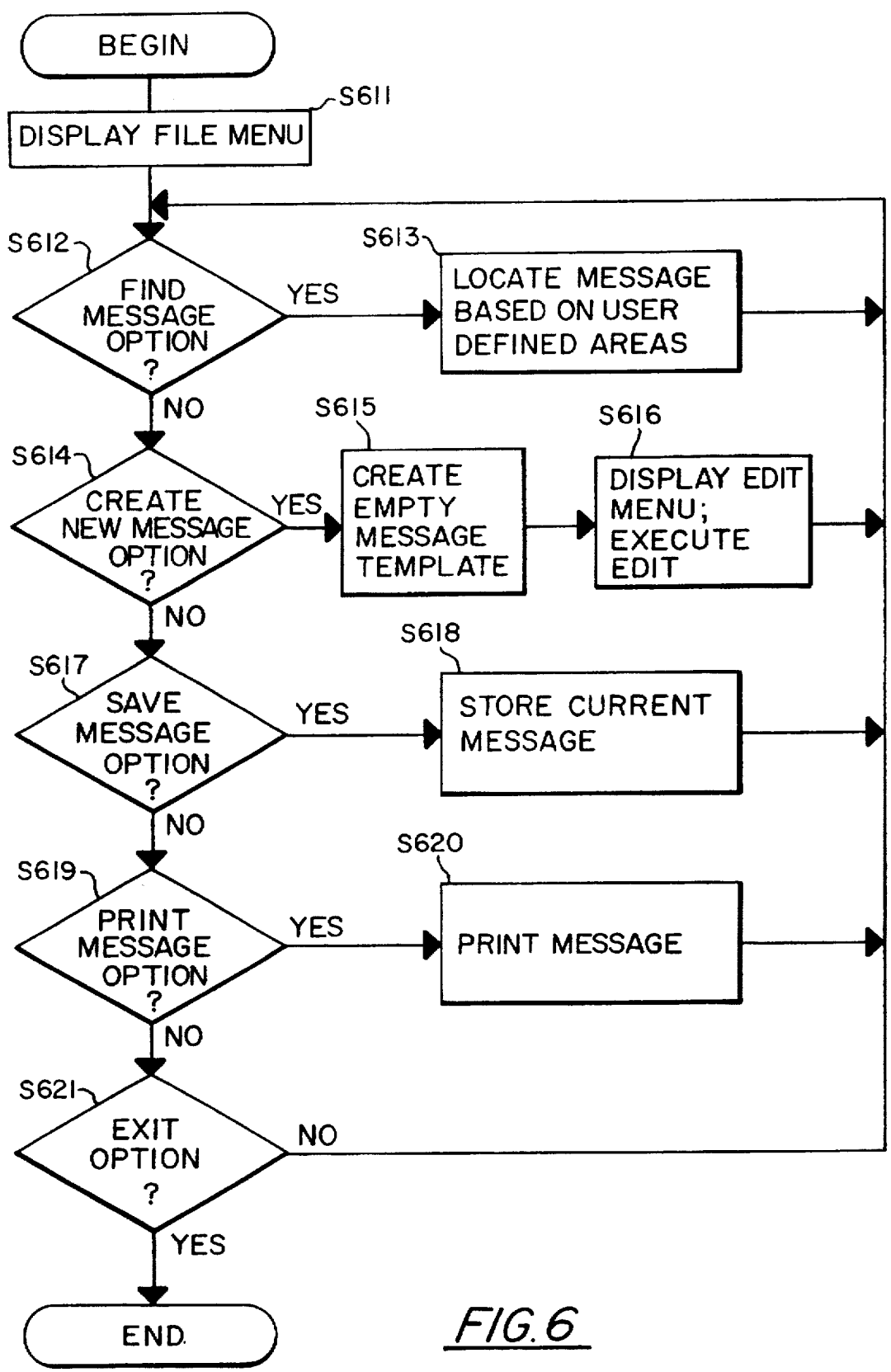

FIG. 6 provides details of the process steps stored in ROM 42 and executed by CPU 40 when the file manager menu is selected in step S512 (FIG. 5). As shown in step S611, CPU 40 first displays the file manager menu. This menu gives the user access to multimedia messages without regard to the particular folder in which the multimedia message is located.

If in step S611 the user selects the find message option, then CPU 40 locates a particular multimedia message based on user defined parameters for the multimedia message (step S613). For example, the user may define a particular recipient, a particular subject, a particular status, or any other information in the multimedia message, or any combination of the above in accordance with user-defined selection rules. CPU 40 identifies all multimedia messages which satisfy the user-defined parameters and provides the user with access to any messages so identified.

If in step S612 the user does not select the find message option but in step S614 selects the create new message option, then in step S615 CPU 40 creates an empty multimedia message template into which the user may write his desired multimedia message. In step S616 CPU 40 displays the edit menu and executes edit processing as more fully described below in connection with FIG. 13.

If in step S614 the user does not select the create new message option but in step S617 selects the save message option, then in step S618 CPU 40 stores the current multimedia message onto the desired storage medium, that is, RAM 44 or other memory such as fixed disk 43.

If in step S617 the user does not select the save message option, but in step S619 the user selects the print message option, then in step S620 CPU 40 causes the multimedia message to be printed on printer 51 to the extent that the message is visually perceptible. Before printing, the user may employ conversion utilities, such as a limited vocabulary speech-to-text conversion, as described below with respect to FIG. 11, to increase the number of visually perceptible parts of the message.

If in step S619 the user does not select the print message option, but in step S621 selects the exit option, then the file manager processing is terminated and control reverts to the main menu shown in FIG. 5. On the other hand, if the user does not select the exit option, then control returns to step S612.

Figure 7:
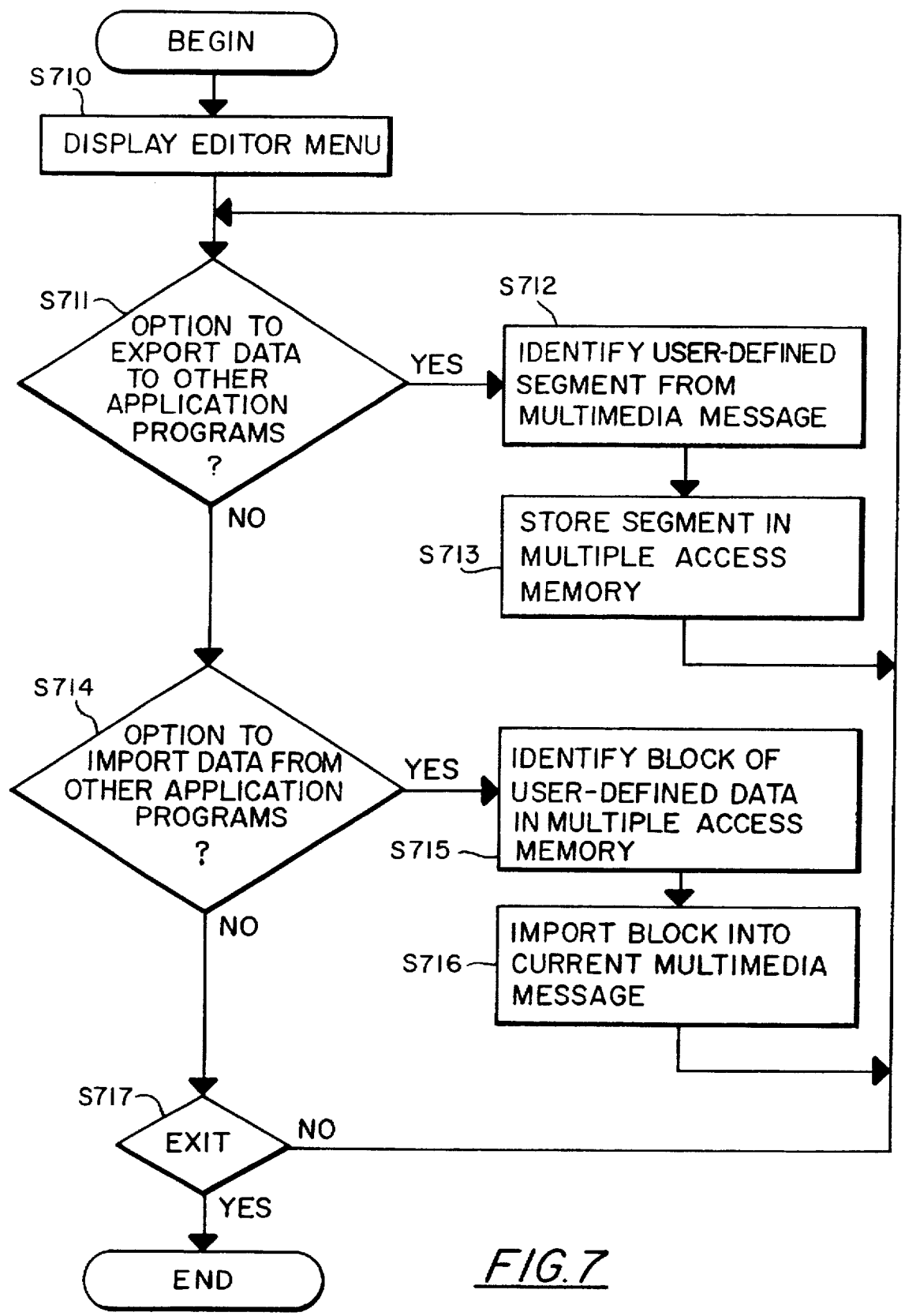

FIG. 7 shows the process steps that are stored in ROM 42 and executed by CPU 40 when information editor processing is selected in steps S513 and S514 (FIG. 5).

As shown in step S710, CPU 40 displays on display 12 the information editor menu. The information editor menu is provided to allow the user to import and to export information and messages to and from other information processing programs that may be running in CPU 40, and to import and export information and messages to and from information processing programs that are running on a host computer and which are accessed via host computer interface 30.

As shown in step S711, if the option to export information or messages to other information processing programs is selected, then CPU 40 in step S712 identifies a user-defined multimedia message and stores the message so identified into a multiple access memory segment in RAM 44 (step S713). The multiple access memory segment is accessible by other programs running in CPU 40, or other programs running in the host computer via host computer interface 30, and accordingly may be accessed by those other programs and exported from the multimedia message handling system.

If in step S711 the export option is not selected but in step S714 the option to import information or message from other information processing programs is selected, then in step S715 CPU 40 identifies user defined information in a multiple access memory segment and imports the data so identified to a multimedia message (step S716). The multiple access memory segment need not be located in RAM 44 but may instead be located in a memory segment found in the host computer.

If in step S714 the import option is not selected but in step S717 the exit option is selected, then information editor processing is terminated and flow returns to step S514 (FIG. 5). On the other hand, if the exit option is not selected, then flow returns to step S711.

Figure 8A:
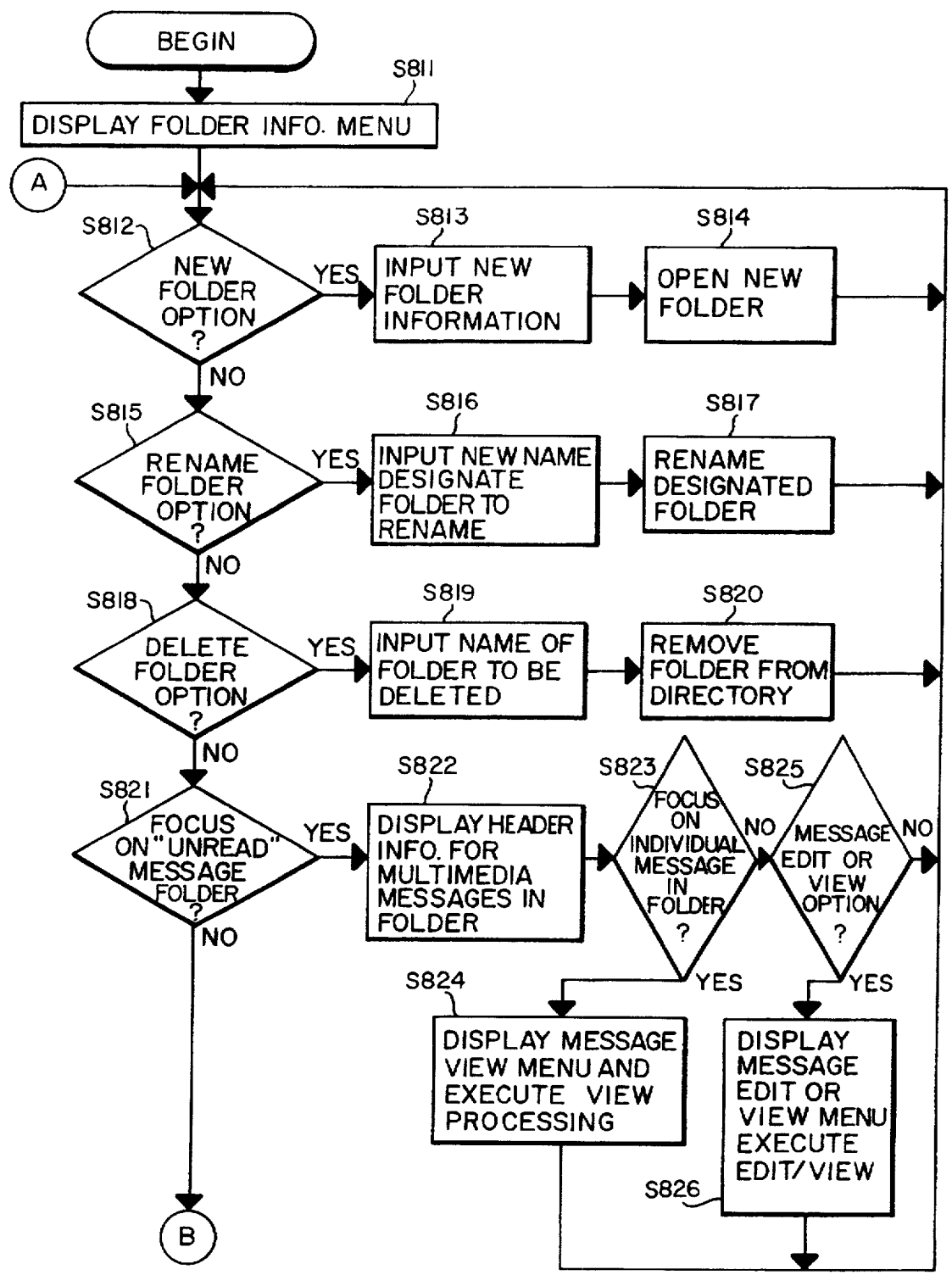
Figure 8B:
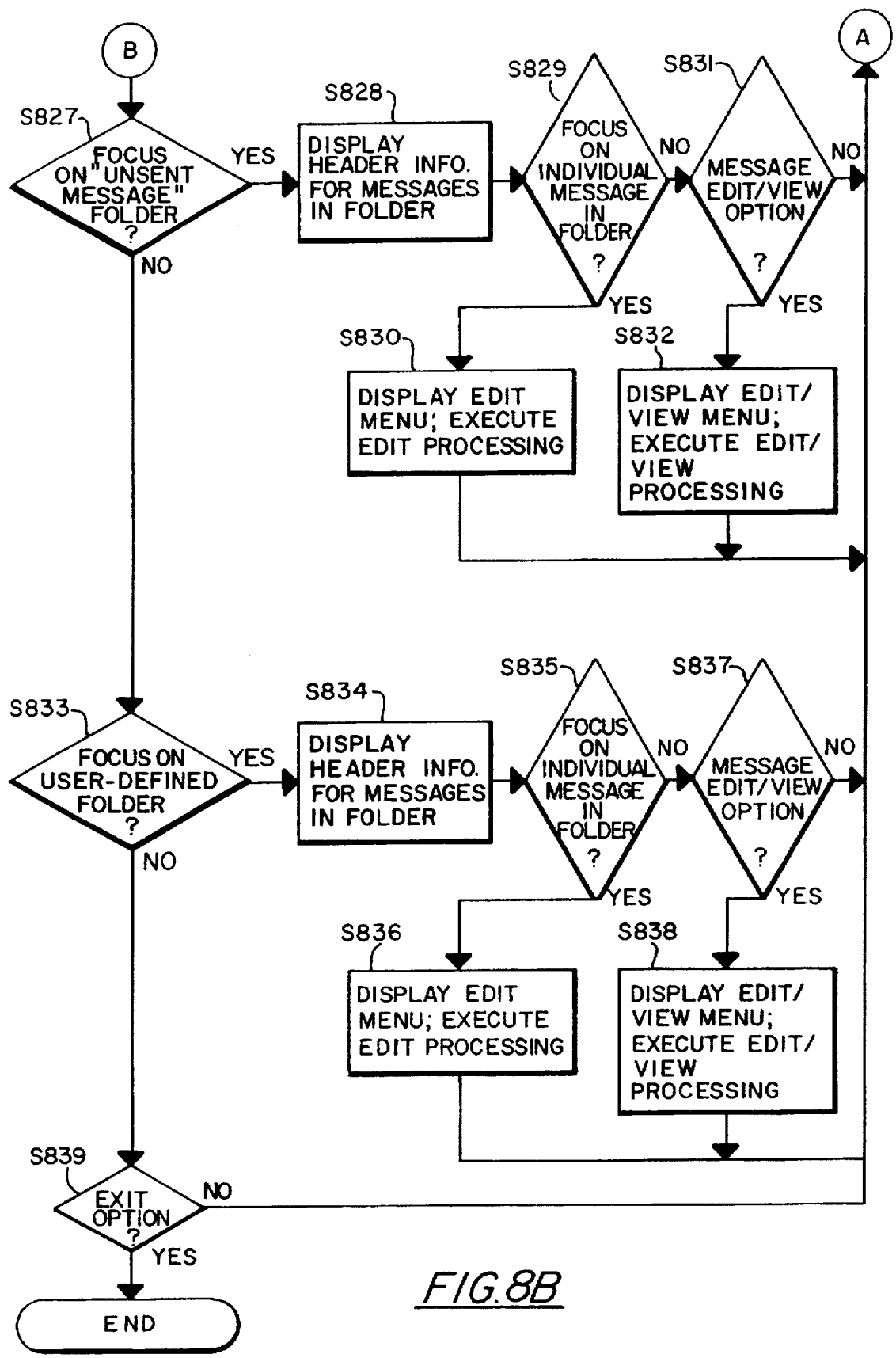

FIG. 8 depicts the process steps that are stored in ROM 42 and executed by CPU 40 when the folder information option is selected in steps S515 and S516 (FIG. 5). As shown in step S811, CPU 40 displays on display 12 the folder information menu. The user selects folder information options from the folder information menu by manipulating a pointing device adjacent the pen-capable touch sensitive screen of display 12. These options permit the user to manipulate folders in which multimedia messages are stored.

As shown in step S811, if the new folder option is selected then in step S813 CPU 40 inputs from touch sensitive screen 12 or other input device (for example, keypad 15 or control buttons 14) information concerning the new folder such as the title of the folder and the types of incoming multimedia messages for which the user desires automatic storage in the new folder. In step S814, CPU 40 opens the new folder and increments the number of folders currently being handled by the CPU.

If in step S812 the new folder option is not selected, but in step S815 the rename folders option is selected, then in step S816 CPU 40 inputs the new name for the folder and obtains the designation of the folder to be renamed. In step S817, the designated folder is renamed.

If in step S815 the rename option is not selected but in step S818 the delete folder option is selected then CPU 40 inputs through touch sensitive display 12 the name of the folder to be deleted (step S819). After confirming that the folder should be deleted, in step S820 CPU 40 removes the designated folder from the directory.

If in step S818 the delete folder option is not selected but in step S821 the user focuses on the unread message folder, then in step S822 CPU 40 displays heading information for multimedia messages in the unread message folder. Based on this display, the user is able to review heading information for each of the multimedia messages in the folder. If in step S823 the user focuses on a particular multimedia message in the folder, then in step S824 CPU 40 displays the message view menu and executes message view processing described more fully below in connection with FIG. 14. If, on the other hand, the user does not focus on an individual multimedia message in the unread message folder but instead selects a particular message for editing or viewing (step S825) then in step S826 CPU 40 displays the edit or view menu, as appropriate, and executes the edit or view processing as described more fully below in connection with FIGS. 13 and 14, respectively.

If in step S821 the user does not focus on the unread message folder but in step S827 the user focuses on the unsent message folder, then in step S828 through step S832 CPU 40 executes a series of process steps that are similar to those executed in steps S822 through S826.

Likewise, if in step S833 the user focuses on a user defined folder then in step S834 through step S838 CPU 40 executes a corresponding series of process steps.

If in step S839 the exit option is selected then folder processing terminates and flow returns to FIG. 5. On the other hand, if the exit option is not selected, then flow returns to step S812.

Figure 9:
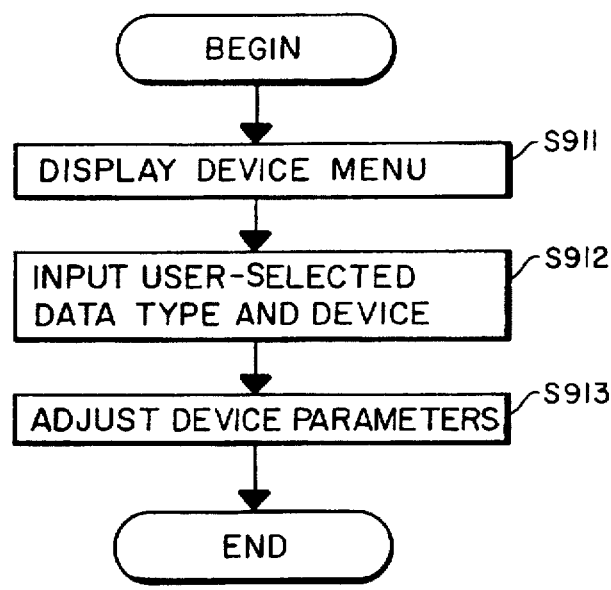

FIG. 9 is a flow chart depicting the process steps that are stored in ROM 42 and executed by CPU 40 when the device selection option is selected in steps S517 and S518 in FIG. 5. As shown in step S911, CPU 40 displays a device selection menu on display 12. By selecting options on the device selection menu, the message handling equipment provides the ability to select user-defined input devices for creating multimedia messages (for example, the scanner or video interface for image information, a keyboard displayed in display 12 for text information, a specific file on disk 43 for binary information, audio interface 55 for voice information, and combinations of these for OLE information), and allows user-defined changes in control parameters for those devices.

In step S912, the user-selected information type and the device for the source of the information are inputted through pen-capable touch-sensitive screen 12 or other input devices (for example, keypad 15 or control buttons 14). Thus, in step S912, the user is able to define the information type for the objects on each page of the multimedia message, and is able to define the device from which the information contents for that object will be found.

In step S913, CPU 40 permits the user to adjust the device parameters for the selected device. Thus, for example, in step S913 CPU 40 permits the user to control the resolution of scanner 50, the data rate for voice digitizer 45, the baud rate for modem 46, etc.

After step S913, device selection processing terminates and flow returns to FIG. 5.

Figure 10:
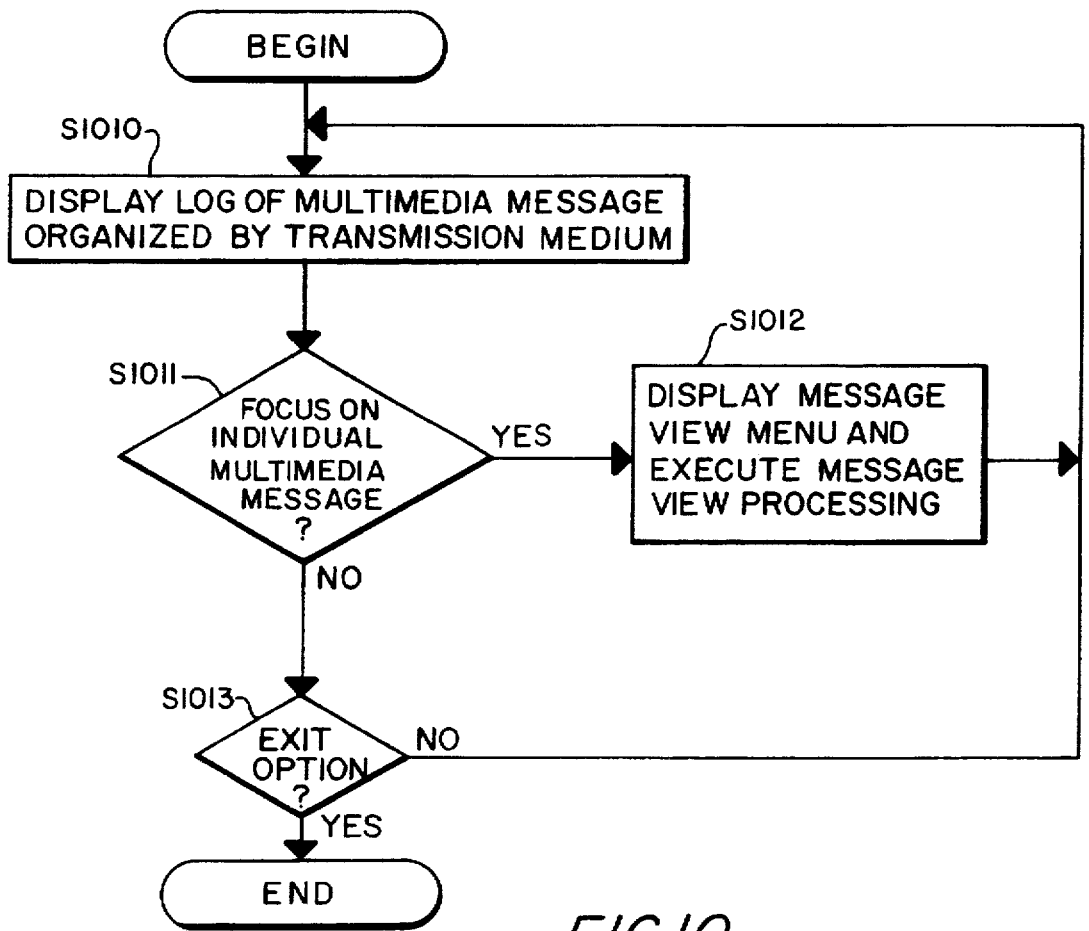

FIG. 10 depicts the process steps that are stored in ROM 42 and executed by CPU 40 when the message log options are selected in steps S519 and S520 (FIG. 5). As shown at step S1010, CPU 40 displays on display unit 12 a log of all message received by the multimedia message handling equipment. The display is organized by transmission device (that is, by facsimile, modem, voice telephone, etc.) together with log information such as time and date of receipt.

If in step S1011 the user activates touch sensitive screen 12 to focus on an individual one of the multimedia messages displayed in the message log, then in step S1012 CPU 40 displays the message viewing menu and executes message viewing processing as described more fully below in connection with FIG. 14.

If, on the other hand, the user does not focus on an individual multimedia message in step S1011, but selects the exit option in step S1013, then log information processing terminates and flow returns to FIG. 5.

Figure 11:
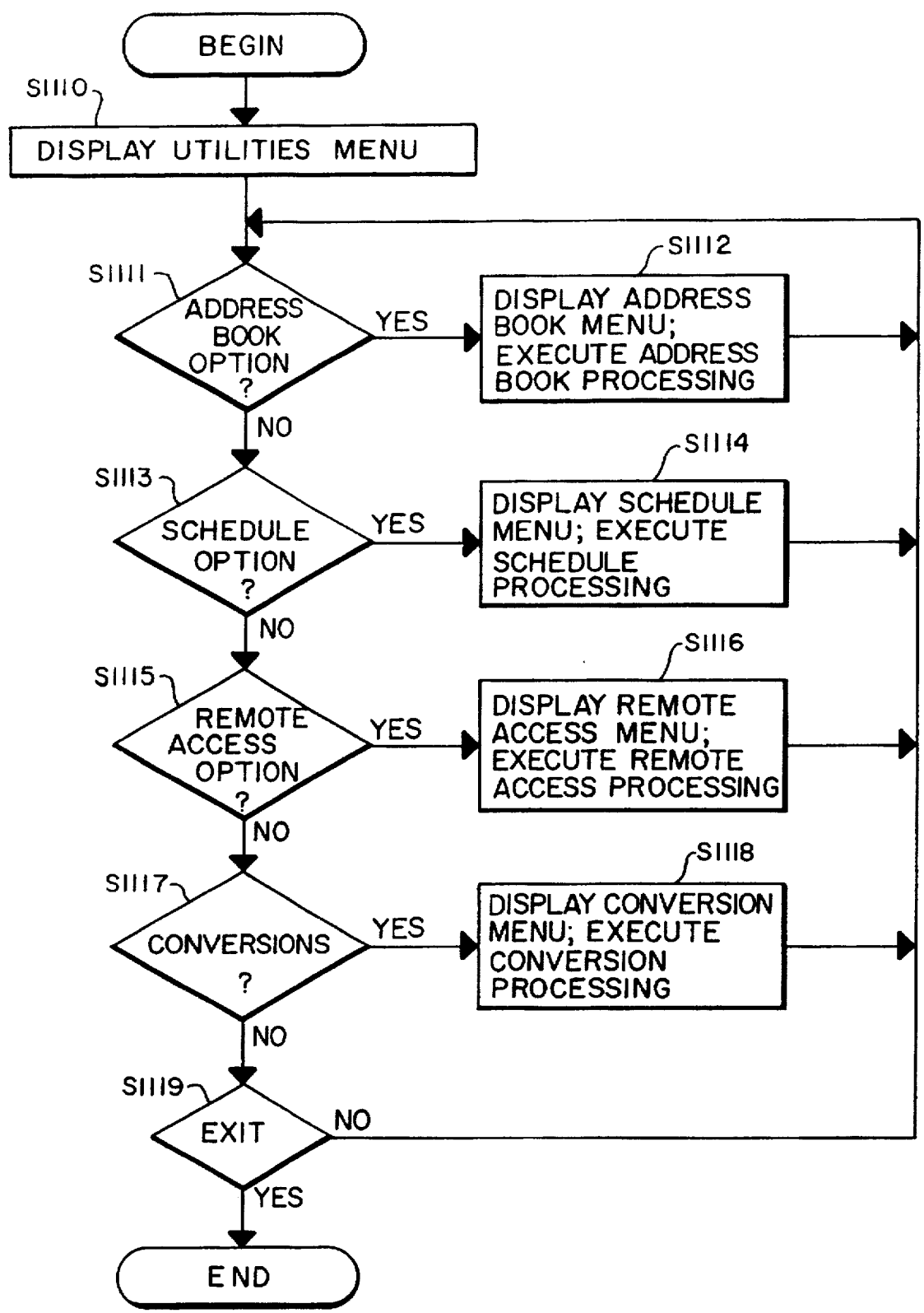

FIG. 11 depicts the process steps that are stored in ROM 42 and executed by CPU 40 when the utilities selection processing is selected in steps S521 and S522 (FIG. 5). As shown in step S1110, CPU 40 displays on display 12 the utilities menu. By activating touch sensitive screen 12, the utilities menu provides the user with the ability to access various utility routines in the multimedia message handling equipment.

If in step S1111 the address book option is selected, then in step S1112 the CPU displays an address book of correspondence addresses that have been previously recorded by the system. Correspondence addresses may be organized and/or displayed in any of a variety of formats, for example, alphabetically, by subject matter, or by class of correspondent (for example, vendor or client). In addition, correspondence information may be stored and displayed for each correspondent. Such information may, for example, include correspondence addresses, facsimile, modem and E-mail addresses, and the transmission device by which the correspondent prefers to receive multimedia messages, for example, via facsimile, modem or voice telephone. The information may be organized into groups to allow automatic message transmission to each member of the group.

If in step S1111 the address book option is not selected but in step S1113 the scheduler option is selected, then in step S1114 CPU 40 displays the scheduler menu and executes scheduling processing as described more fully below in connection with FIG. 12. This processing permits the user to schedule message transmission at any desired time and to any desired recipient or group of recipients. Thus, for example, CPU 40 permits the user to schedule facsimile or modem transmissions at off-peak hours, and permits the user to send the same multimedia message to a number of different recipients as selected, for example, from the address book. In the case of multiple recipients of the same multimedia message, the CPU 40 may reformat the multimedia message to match the preferred mode of transmission for each recipient. Such conversions are described more fully below in connection with step S1118.

If in step S1113 the scheduler options are not selected but in step S1115 the remote access option is selected then in step S1116 CPU 40 displays a remote access menu. This menu permits the user to activate the remote access capabilities of the device, as described below in connection with FIGS. 15A, 15B and 15C. That is, in step S1116 CPU 40 may be configured to permit a host computer to access the multimedia message handling system and the software capabilities therein via modem 46. In addition, in connection with the conversion capabilities described more fully below in connection with step S1118, a remote user may access the message handling system and the software therein through a conventional voice telephone by voice commands or DTMF telephone keypad commands, thereby to receive voice messages or voice message convertible messages over a conventional voice telephone.

If in step S1115 the remote access option is not selected but in step S1117 the conversion options are selected, then in step S1118 CPU 40 displays the conversion menu and executes conversion processing. This processing permits a number of conversions from one message type to another message type. More particularly, in normal operation, the mixed information types on each page in the multimedia message are preserved. Thus, voice information will be preserved as voice information while image information will be preserved as image information. However, certain information types are convertible to other information types, and such conversion may be desired for transmission over different transmission devices. Conversion capabilities for this embodiment of the invention are summarized in the following table:

| | OUTPUT | | | | |
|---|---|---|---|---|---|
| | Text | Image | Voice | Binary | OLE |
| INPUT | | | | | |
| Text | Yes | Yes | Yes (speech synthesis) | Yes | No |
| Image | Yes (OCR) | Yes | Yes (OCR plus speech synthesis) | Yes | No |
| Voice | Yes (limited vocab.) | Yes (limited vocab.) | Yes | Yes (limited vocab.) | No |
| Binary | if approp. | if approp. | if approp. | Yes | No |
| OLE | if approp. | if approp. | if approp. | if approp. | Yes |

In particular, it is possible to convert a limited vocabulary of voice information into text information through speech recognition techniques, and it is possible to convert text information into voice information through speech synthesis techniques depicted, for example, with respect to voice digitizer/synthesizer 45. In the case of facsimile or other image transmission of text, it is possible to perform optical character recognition on the image information to convert the image information to text information. It is further possible to convert text information to image information for transmission via facsimile or otherwise. In step S1118, CPU 40 provides for the desired conversions and, for example, provides for the conversion of image information of text into text information and further conversion of the text information to voice-synthesized information.

If in step S1119 the exit option is selected then the utilities processing terminates and flow returns to FIG. 5. On the other hand, if the exit option is not selected, then flow returns to step S1112.

Figure 12:
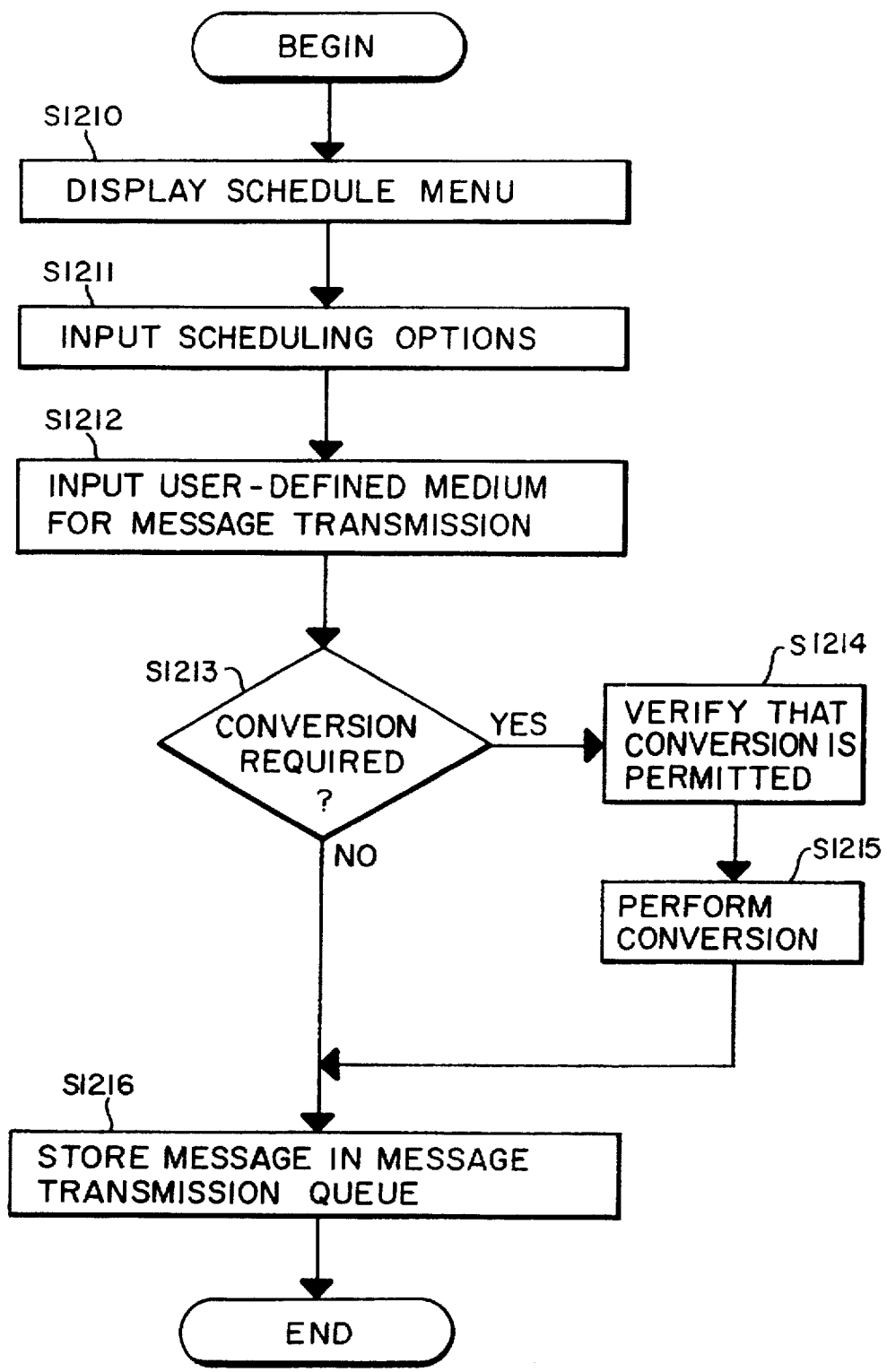

FIG. 12 depicts the process steps that are stored in ROM 42 and executed by CPU 40 in the event that the scheduler option is selected in steps S1104 and S1105 (FIG. 11). As shown in step 1210, CPU 40 displays on display 12 a scheduler menu. The scheduler menu permits a user to schedule transmission of multimedia messages at desired times and dates, to schedule transmission of multimedia messages to desired recipients or groups of recipients, and to schedule the transmission of multimedia messages over any of the available transmission devices, for example, voice telephone, modem or facsimile.

In step S1211, CPU 40 inputs from touch sensitive screen 12 the desired scheduling options as defined by the user. For example, it is possible for the user to specify transmission of multimedia messages during off-peak times and to schedule the transmission of multimedia messages to a group of recipients as defined, for example, in connection with the address book options (see step S1111 of FIG. 11).

In step S1212, the user defines the transmission device for message transmission. In the multimedia message handling system of this embodiment, the transmission devices available for transmission are standard voice telephone, modem and facsimile.

In step S1213, CPU 40 determines whether conversion is required. For example, if facsimile transmission has been selected for a multimedia message that contains text information then a conversion from text to image is required. In step S1214, CPU 40 determines whether the conversion is permissible in accordance with the above table. For example, at present it is not possible to convert general image information to voice information unless the image information is an image of text data. In step S1215 the conversion is performed as specified more fully above in connection with step S1118 (FIG. 11). If conversion is not possible, then an icon representing the unconverted information is provided. For example, for facsimile transmission of non-convertible voice information, an image of a voice icon is provided. Likewise, for voice transmission of non-convertible image information, voice information indicating the presence of an image is provided.

In step S1216, the multimedia message, in the desired transmission format, is placed in the message transmission queue for transmission at the time and to the recipients that were scheduled in step S1211. Thereupon scheduler processing terminates and flow returns to FIG. 11.

Figure 13A:
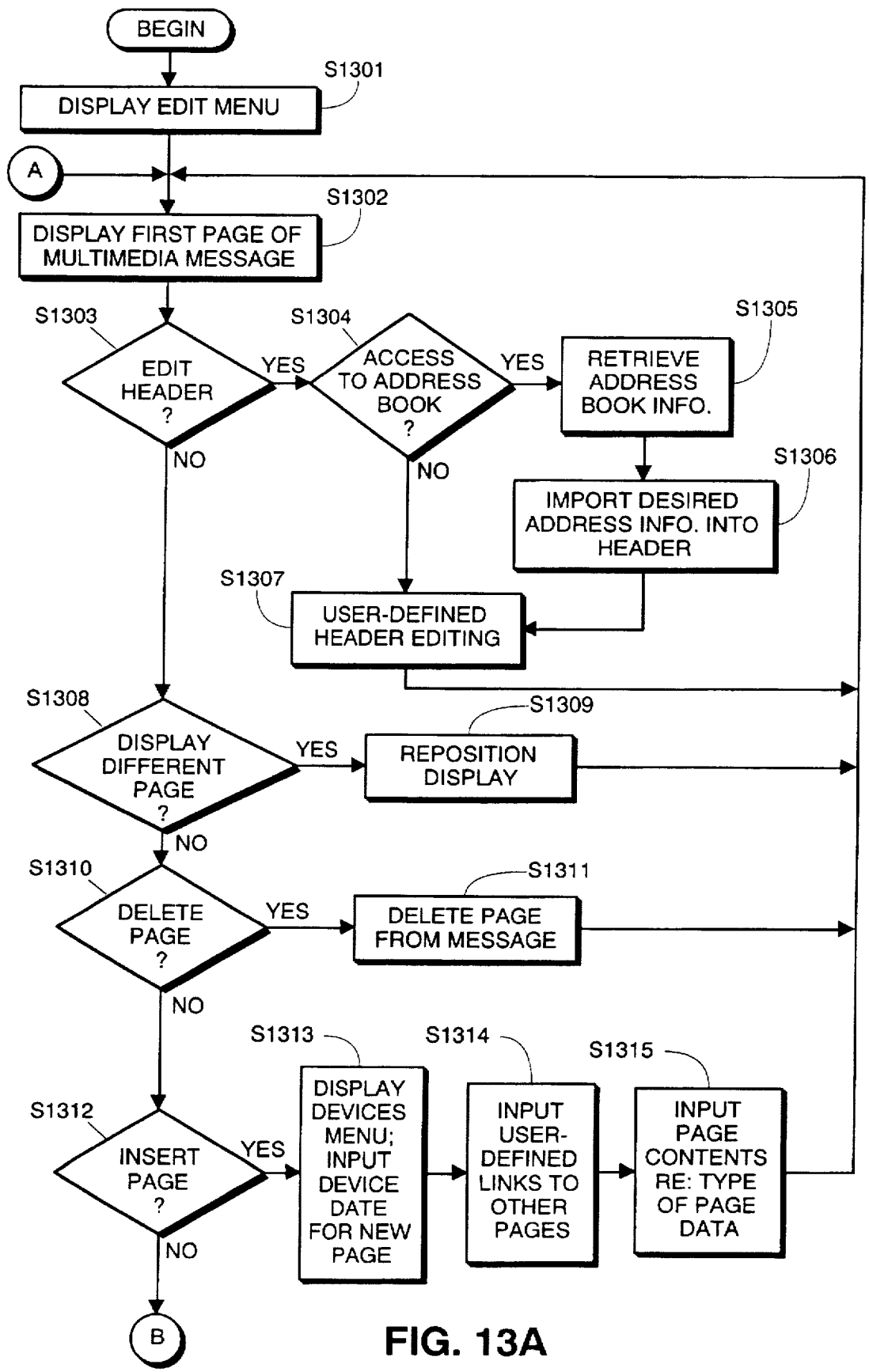
Figure 13B:
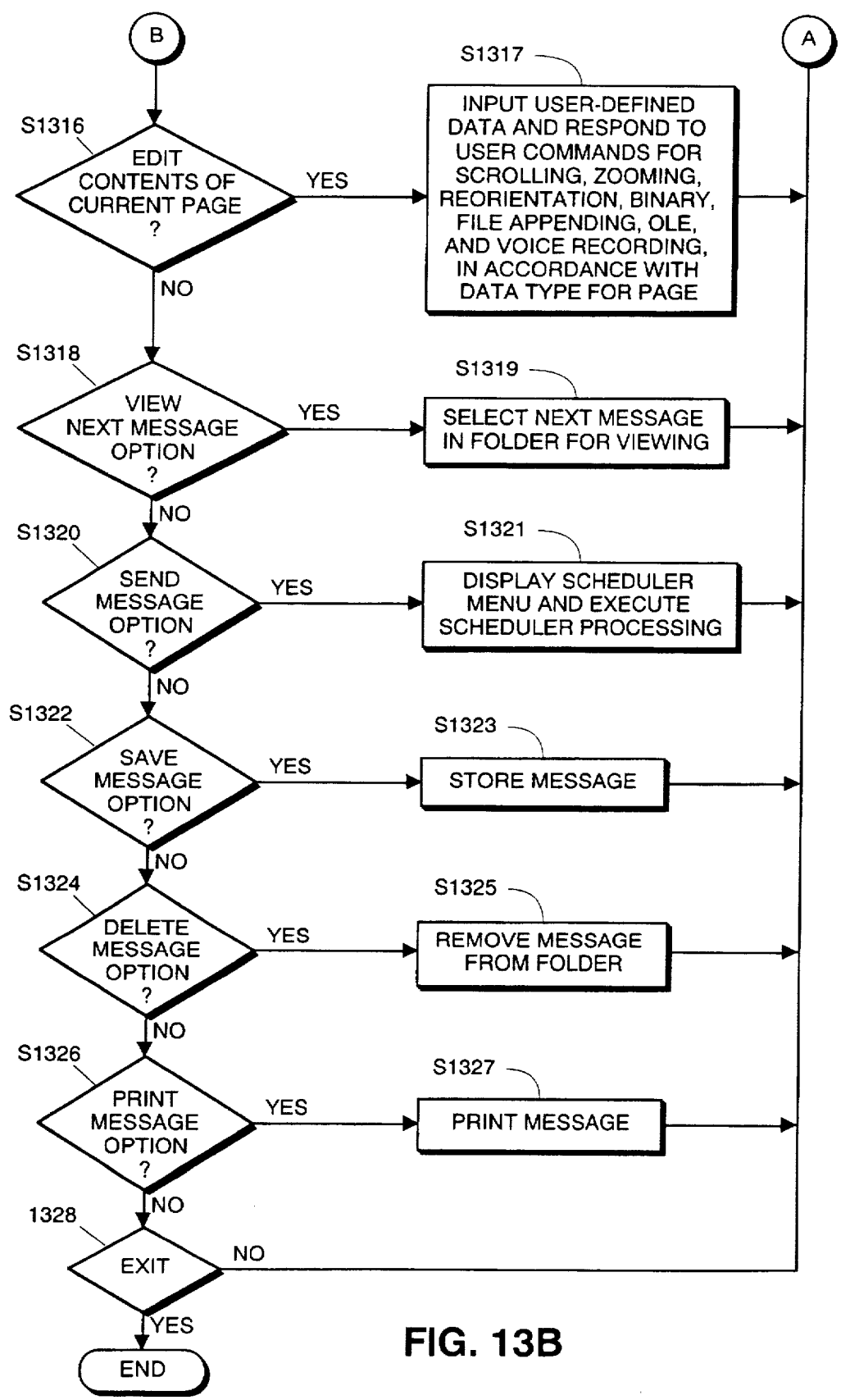

FIG. 13 depicts the process steps stored in ROM 42 and executed by CPU 40 when edit processing is selected, for example, from steps S821 through step S838 of FIG. 8. As shown in step S1301, CPU 40 displays on display 12 a menu of edit options. By selecting options through touch sensitive screen 12, the multimedia message handling equipment provides the capability of editing various aspects of multimedia messages.

In step S1302, CPU 40 displays the first page of the multimedia message being edited together with header information for the multimedia message. In step S1303, if the header editor option is selected then in step S1304 CPU 40 determines whether access to the address book is desired. If access to the address book is desired, then in step S1305 the address book information is retrieved and in step S1306 information designated by the user is imported from the address book into the header. In step S1307, CPU 40 permits the user to edit header information.

If in step S1303 header editing is not selected but in step S1308 the option to display a different page is selected then in step S1309 the CPU repositions display of the multimedia message to the desired page. The desired page may be selected in accordance with the linkage information for the displayed page or may simply be selected with a page number input by the user through touch sensitive screen 12.

If in step S1308 the option to display a different page is not selected but in step S1310 the delete page option is selected, then in step S1311 CPU 40 deletes the designated page from the multimedia message.

If in step S1310 the delete page option is not selected but in step S1312 the insert page option is selected then in step S1313 CPU 40 displays the devices menu and executes device processing as described more fully above in connection with FIG. 9. This processing permits the user to designate the input device and the information type for the inserted page. In step S1314 CPU 40 permits the user to define links to other pages and permits the user to input the contents of the page in accordance with the message type designated in step S1313. In more detail, if in step S1313 the information type is designated as text information, then in step S1314, text may be entered via display 12 or may be retrieved from memory or a host computer via host computer interface 30. If in step S1313 image information is designated then the image may be input in step S1314 via scanner 50, video interface 52, or retrieved from memory or a host computer. If in step S1313 voice or other audio information is designated, then in step S1314 a voice message may be obtained through audio interface 55 in connection with voice digitizer 45 or, as before, retrieved from memory or a host computer. If in step S1313 binary information, for example, executable code, is specified then in step S1314 binary information may be imported from memory or the host computer via host computer interface 30. If in step S1313, OLE information is specified, then in step S1314, the imbedded object link is specified.

If in step S1312 the insert page option is not selected but in step S1316 the edit current page option is selected then in step S1317 CPU 40 responds to user directed editing commands, such as commands for scrolling, zooming, reorientation, binary file appending and voice recording, in accordance with the message type of the current page and the user's instructions.

If in step S1316 the edit current page option is not selected but in step S1318 the view next message option is selected, then in step S1319 CPU 40 selects the next message in the current folder for viewing.

If in step S1318 the view next message option is not selected but in step S1320 the send message option is selected then in step S1321 CPU 40 displays the scheduler menu and performs scheduler processing as described more fully above in connection with FIG. 12.

If in step S1320 the send message option is not selected but in step S1322 the save message option is selected then in step S1323 CPU 40 saves the current message in RAM 44 or other memory such as fixed disk 43, as designated by the user.

If in step S1322 the save message option is not selected but in step S1324 the delete message option is selected then in step S1325 CPU 40 deletes the current message from its current storage location.

If in step S1324 the delete message option is not selected but in step S1326 the print option is selected then in step S1327 CPU 40 causes the current message to be printed on printer 51 to the extent that the message is visually perceptible. Before printing, the user may employ conversion utilities, such as available speech-to-text conversion, as described above with respect to FIG. 11, to increase the number of visually perceptible parts of the message.

If in step S1326 the print option is not selected but in step S1328 the exit option is selected then edit processing terminates. If, on the other hand, the exit option is not selected then flow returns to step S1302.

Figure 14A:
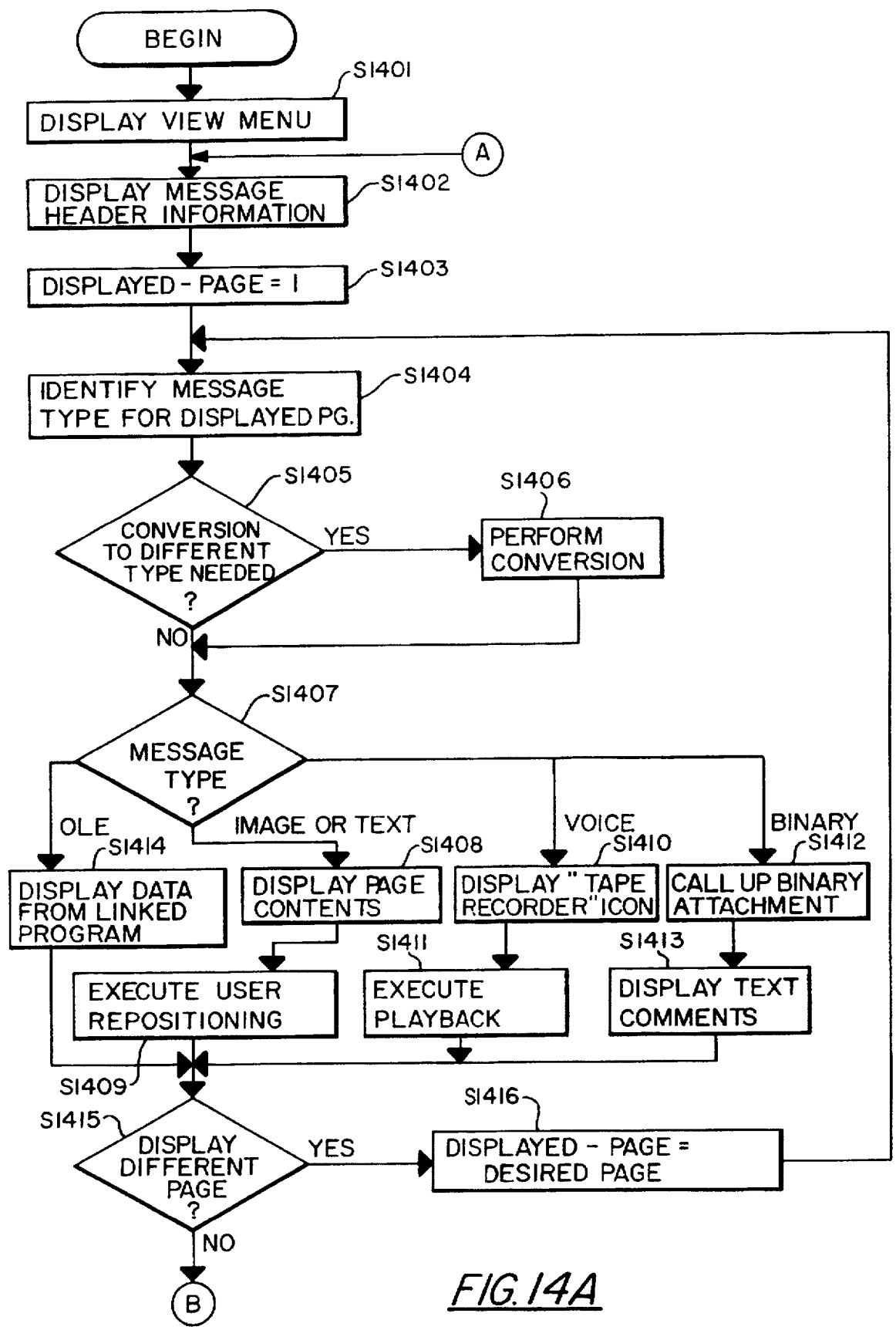
Figure 14B:
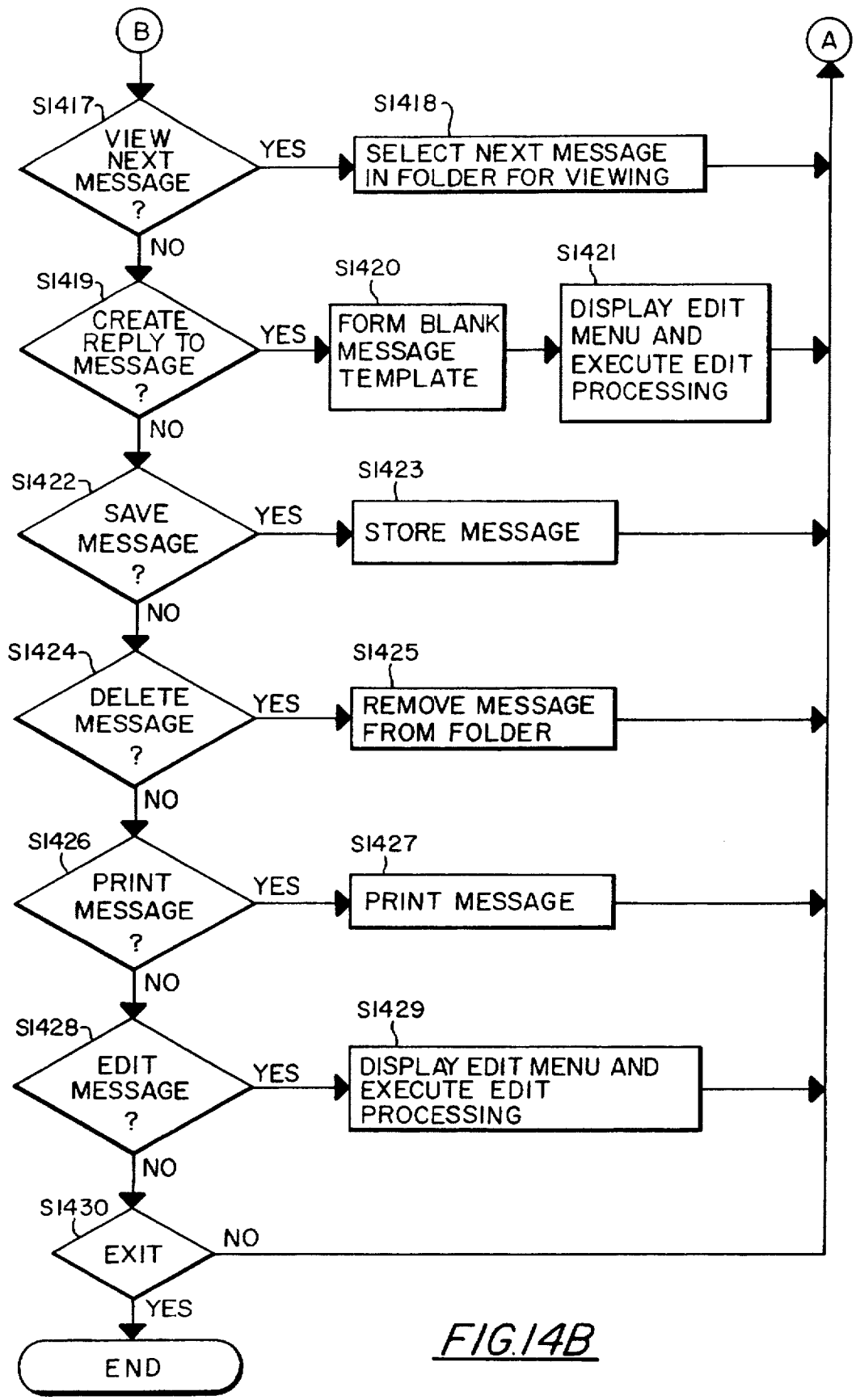

FIG. 14 shows the process steps stored in ROM 42 and executed by CPU 40 in the event that view message processing is selected, for example, in connection with steps S821 through steps S838 of FIG. 8. As shown in step S1401, CPU 40 displays on display 12 a view menu. The view menu provides the user with access to the capabilities of the multimedia message handling equipment for viewing and manipulating multimedia messages in a multimedia environment.

Figure 3:
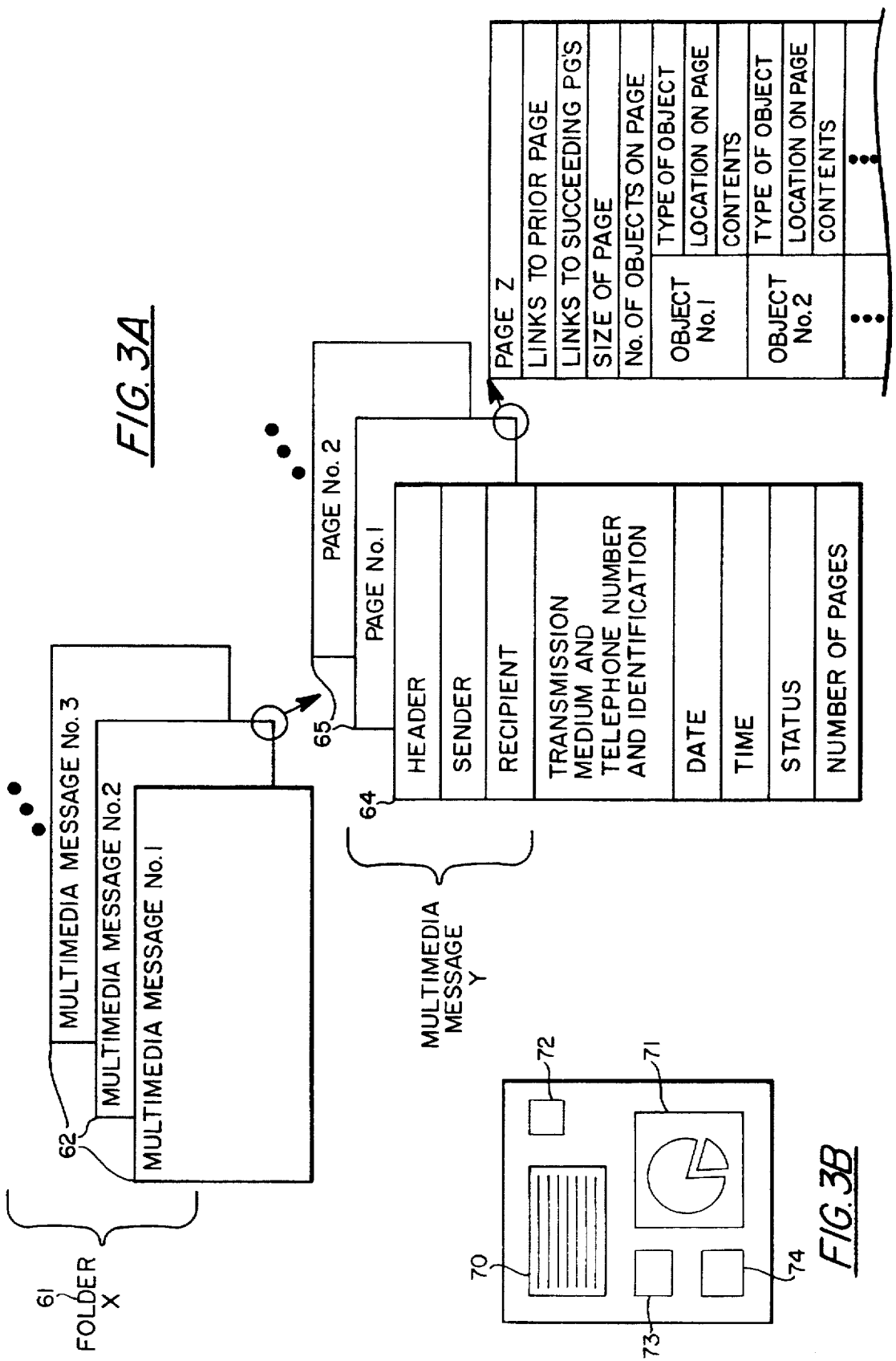
FIG. 3A is a diagram for explaining one format for storing multimedia messages and FIG. 3B is an example of a multimedia message display.

In step S1402, CPU 40 displays on display 12 the message header information that is depicted at 64 in FIG. 3. In step S1403 the currently displayed page is set to the first page of the multimedia message. In step S1404, CPU 40 identifies the types of information in the currently displayed page. In step S1405, CPU 40 determines whether a conversion to a different type of information is required. For example, if it is desired to "listen" to a text message, then a conversion is required from text to voice. Any necessary conversions are performed in step S1406, as described in connection with step S1118 (FIG. 11).

In step S1407, and in accordance with the types of information for the page, CPU 40 determines how the message is to be displayed. In the case of a page containing image or text information, flow progresses to step S1408 wherein CPU 40 displays on display 12 the contents of the current page. In step S1409, CPU 40 responds to user commands for scrolling, zooming, reorientation and other viewing commands.

If in step S1407 the information type is voice, then in step S1410, CPU 40 displays a "tape recorder" icon. By touching appropriate buttons displayed on display 12 (for example, a "playback" or a "rewind" button), the user is able to direct and to manipulate the playback of voice information. In step S1411, CPU 40 responds to these directions.

If in step S1407 the information type for the page is binary, then flow progresses to step S1412 in which CPU 40 calls up a binary attachment to the message. The binary attachment is ordinarily stored in RAM 44 but may also be stored in other locations, for example, in fixed disk 43 or in the host computer. In step S1413, CPU 40 displays any accompanying textual comments for the binary information and responds to user commands for viewing the binary attachment.

If in step S1407 the information type is an OLE link then in step S1414 CPU 40 links to the data generated by another application program being executed by CPU 40 (or a host computer via host interface port 30), for example, a spreadsheet program, a word-processing program, or a painting program. The linked data is displayed in visually-perceptible form on display 12.

Regardless of the type of information in the page, flow progresses to step S1415 in which CPU 40 determines whether the user has requested to display a different page. If a different page has been requested, then in step S1416 the desired page is placed into the currently displayed page register and flow progresses to step S1404. The desired page may simply be the next or the previous page of the message, or may be obtained from user defined linkages in the multimedia message If the display different page option was not selected in step S1415 but the view next message option is selected in step S1417 then in step S1418 CPU 40 selects the next multimedia message in the current folder and flow progresses to step S1402.

If the view next message option is not selected in step S1417 but the option to create a reply to the message is selected in step S1419 then in steps S1420 and S1421 the multimedia message handling system provides the capability for replying to the current message by creating a new message. In step S1420, CPU 40 forms a blank message template preaddressed to the sender and in step S1421 CPU 40 displays the edit menu and performs edit processing on the blank template as described more fully above in connection with FIG. 13.

If in step S1419 the create reply option is not selected but in step S1422 the save message option is selected then in step S1423 CPU 40 saves the current message in RAM 44, fixed disk 43 or in any other memory device accessible to the CPU.

If in step S1422 the save message option is not selected but in step S1424 the delete message option is selected then in step S1425 CPU 40 deletes the message from the folder.

If in step S1424 the delete message option is not selected but in step S1426 the print message option is selected then in step S1427 CPU 40 causes the multimedia message to be printed on printer 50 to the extent that the message is visually perceptible. Before printing, the user may employ conversion utilities, such as speech-to-text conversion, as described above with respect to FIG. 11, to increase the number of visually perceptible parts of the message.

If in step S1426 the print message option is not selected but in step S1428 the edit message option is selected then in step S1429 CPU 40 causes the edit message menu to be displayed and performs edit message processing as described more fully above in connection with FIG. 13.

If in step S1428 the edit message option is not selected but in step S1430 the exit option is selected then view processing is terminated and flow proceeds to the calling routine, for example, FIG. 8. On the other hand, if the exit option is not selected then flow returns to step S1402.

Figure 15A:
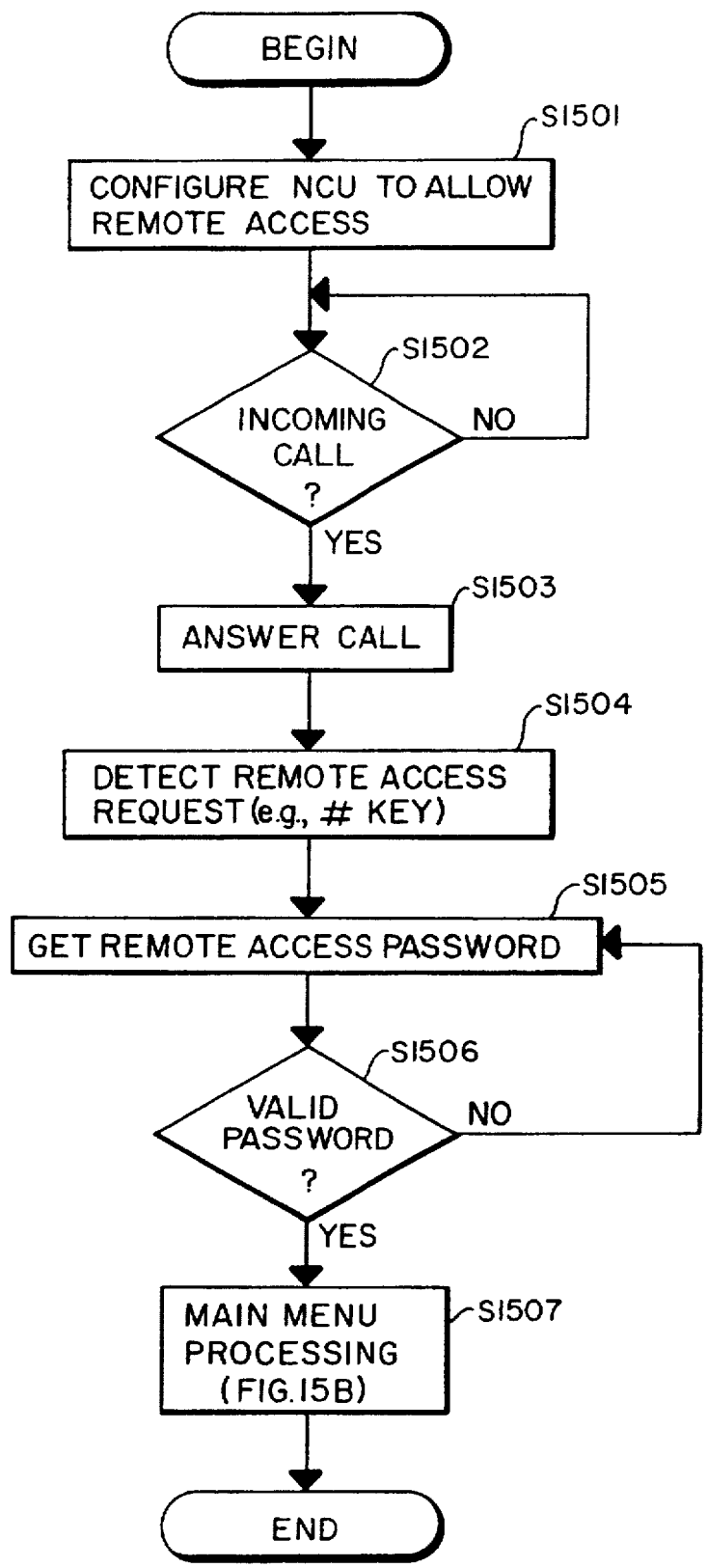
Figure 15B:
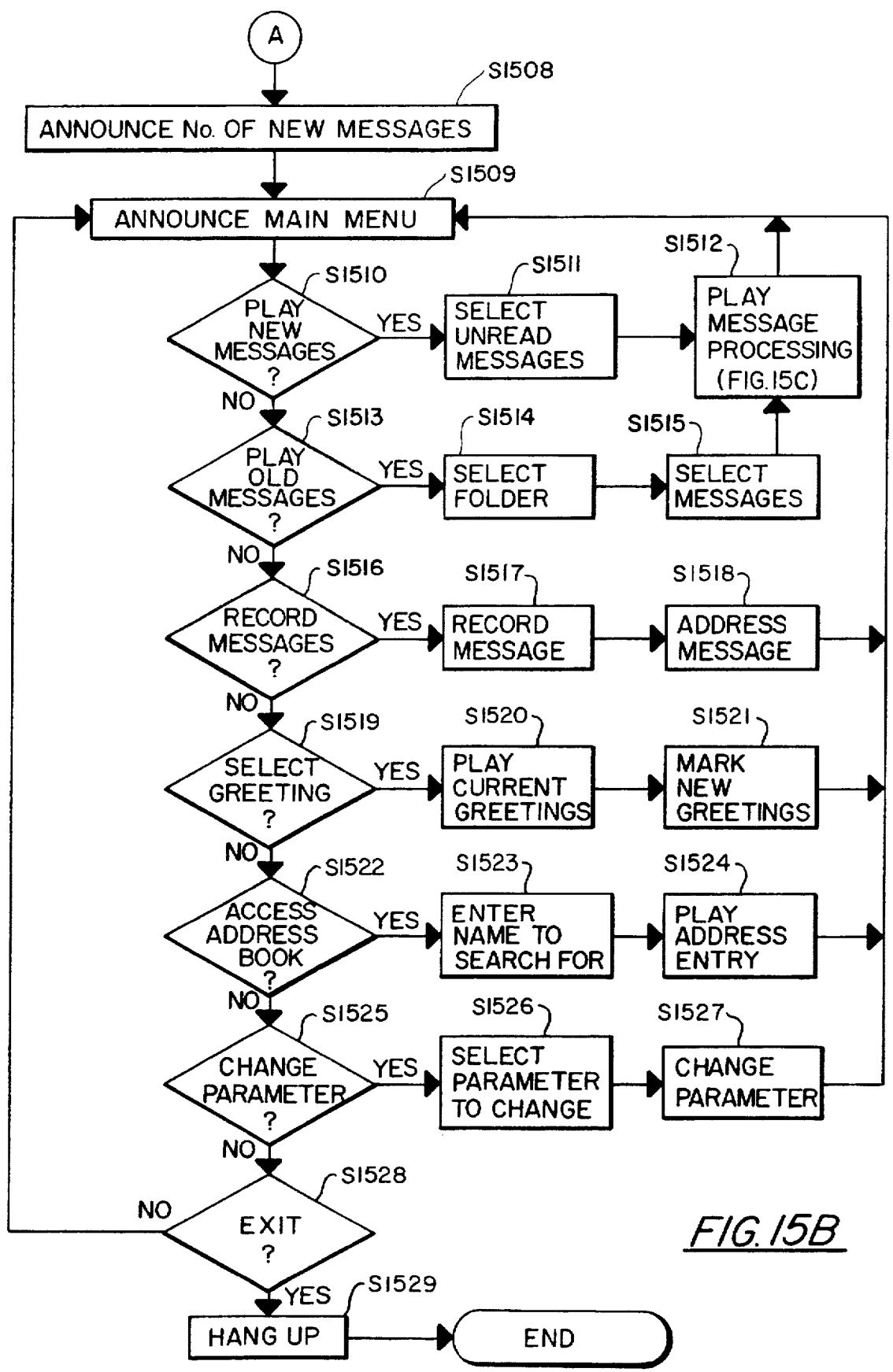
Figure 15C:
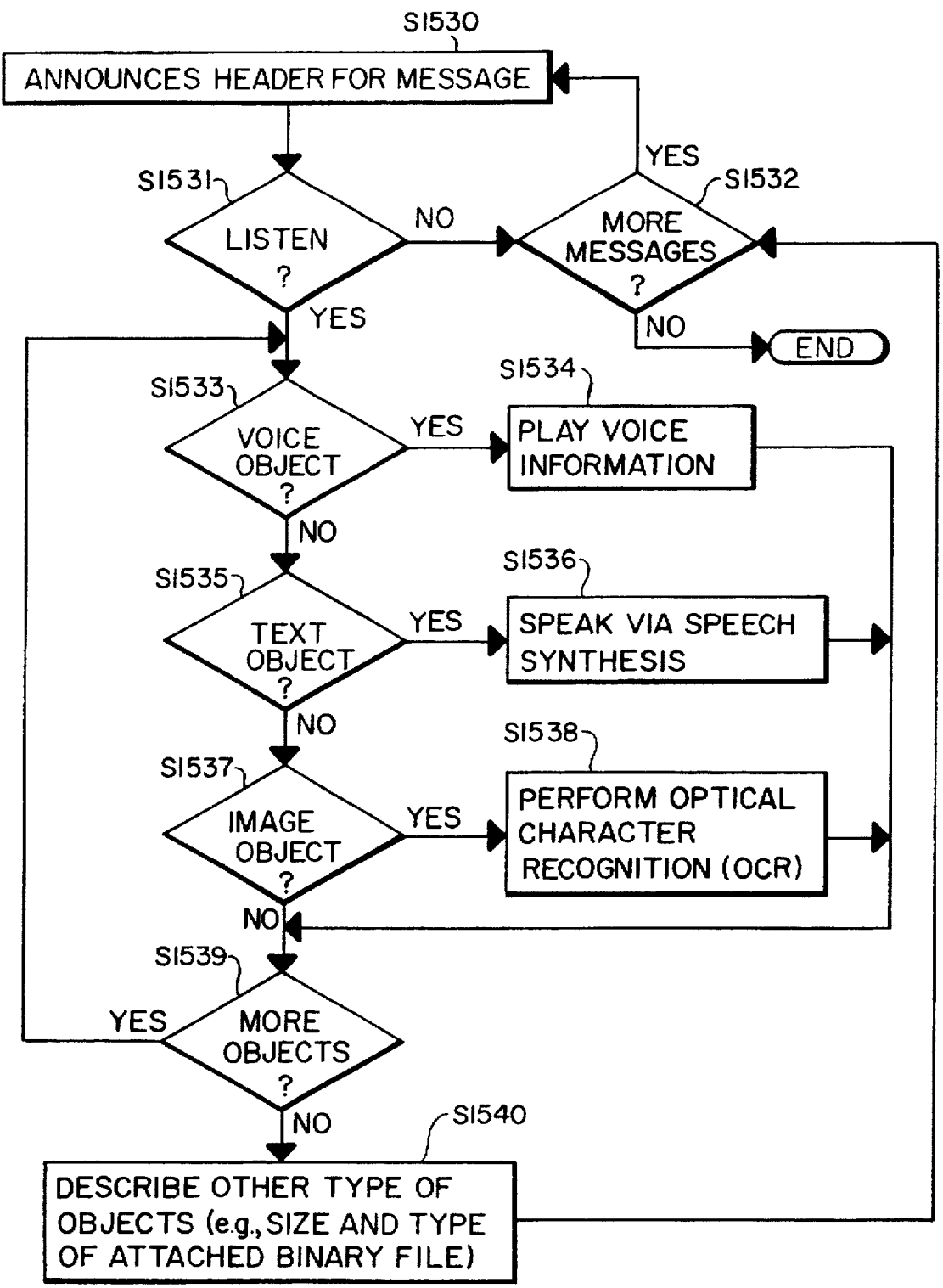

FIGS. 15A, 15B and 15C depict the process steps executed by CPU 40 in the event that remote access is activated by the user as set forth above in connection with step S1116 in FIG. 11. In the description of FIGS. 15A, 15B and 15C, it is assumed that remote access is initiated over ordinary voice telephone but remote access may be initiated by other means, for example, over modem 46.

As shown in FIG. 15A, when remote access has been activated, CPU 40 configures NCU 49 to allow remote access, for example, via voice digitizer/synthesizer 45 or modem 46 (step S1501). In step S1502, CPU 40 idles while waiting for an incoming call. If an incoming call is detected, then in step S1503, NCU 49 answers the call and determines whether the call is a remote access request. For example, as depicted in step S1504, a remote access request may be designated by the DTMF tone associated with a "#" key.

In the event that a remote access request is identified, then in step S1505 the remote access password is requested and accepted. If the password is not valid, then in step S1506 flow is redirected back to step S1505. On the other hand, if a valid password has been entered, then in step S1507 flow progresses to the main processing menu depicted more fully in FIG. 15B.

As shown in FIG. 15B, in step S1508, CPU 40 causes the number of new messages received since the last remote access to be announced. Then, in step S1509, CPU 40 announces the main menu options available to the remote access user. As seen in FIG. 15B, the main menu options available to remote access user are a subset of the options ordinarily available. The remote access user may select the option desired by any one of a number of familiar means, for example, through DTMF tone detection.

If in step S1510, the remote access user requests to play new messages, then in step S1511 CPU 40 selects the unread messages and in step S1512 play message processing is executed as described more fully below in connection with FIG. 15C. Flow then returns to step S1509 for main menu announcement.

If in step S1510 the new message option is not selected but in step S1513 the play old message option is selected, then in step S1514, CPU 40 selects a user-designated folder and in step S1515 selects a user-designated message. Flow then progresses to step S1512 wherein play message processing is executed as described more fully below in connection with FIG. 15C.

If the play old message option is not selected in step S1513 but the record message option is selected in step S1516, then in step S1517 CPU 40 records a new message from the remote access user, and in step S1518 transmits the message as designated by the user. Flow then progresses back to step S1509 wherein CPU 40 announces the main menu.

If the record message option is not selected in step S1516 but the select greeting option is selected in step S1519, then CPU 40 permits the remote access user to alter the current voice greeting on the message handling system. Specifically, as shown in step S1520, CPU 40 plays the current greetings and in step S1521 marks a new greeting that is selected by the remote access user. Flow then progresses to step S1509 wherein the main menu is announced.

If the select greeting option is not selected in step S1519 but the access address book option is selected in step S1522 then in steps S1523 and S1524 CPU 40 permits the remote access user to access the address book. Specifically, in step S1523, the remote access user enters a name to be searched in the address book using, for example, DTMF tone detection technology. In step S1524, CPU 40 plays back the address book entry whereupon flow progresses back to step S1509 wherein CPU 40 again announces the main menu.

If the access address book option is not selected in step S1522 but the change parameters option is selected in step S1525, then CPU 40 permits the remote access user to alter various parameters in the message handling system. For example, in step S1526, the remote access user is permitted to select a parameter for changing (such as a password, transmission schedule times, etc.), and in step S1527 the parameters are changed. Flow then progresses back to step S1509 wherein the main menu is announced.

If the change parameters option is not selected in step S1525 but the exit option is selected in step S1528, then in step S1529 CPU 40 causes NCU 49 to hang up. On the other hand, if the exit option is not selected then flow then progresses back to the main menu announcement (step S1509).

FIG. 15C illustrates the process steps executed by CPU 40 in the event that play message processing is executed in accordance with step S1512 of FIG. 15B. As shown in FIG. 15C, in step S1530 CPU 40 announces header information for the first message. In step S1531, CPU 40 determines whether the remote access user has designated that he will listen to the first message. If in step S1531 it is determined that the remote access user does not wish to listen to the announced message, then in step S1532, CPU 40 determines whether more messages are available. If more messages are not available then processing ends. On the other hand, if more messages are available, then flow progresses to step S1530 in which CPU announces the header for the next message.

If in step S1531 the remote access user designates that he desires to listen to the announced message, then in step S1533 CPU 40 determines whether the first object in the multimedia message is a voice object. If the first object is a voice object then flow progresses to step S1534 in which CPU 40 simply plays the voice information over the voice telephone. Flow then progresses to step S1539 in which CPU 40 determines whether there are more objects. If there are more objects, then flow progresses back to step S1533.

If in step S1533, CPU 40 determines that the first object is not a voice object then in step S1535, CPU 40 determines whether the object is a text object. If the object is a text object then flow progresses to step S1536 in which the text object is converted to voice information and the converted voice information is played back via speech synthesis. As before, flow then progresses to step S1539 in which CPU 40 determines whether there are more objects.

If in step S1535, CPU 40 determines that the first object is not a text object, then in step S1537 CPU 40 determines whether the first object is an image object. If the first object is an image object, then in step S1538 CPU 40 performs optical character recognition to the extent that the image object is an image of text data. The text information obtained from step S1538 is fed to step S1536 in which the text information is speech-synthesized and the speech-synthesized voice information is transmitted. As before, flow then progresses to step S1539. If in step S1539, CPU 40 determines that there are no more voice, text or image objects, then flow progresses to step S1540 in which CPU 40 aurally describes the other types of objects in the multimedia message, for example, the size and type of an attached binary file or the size and extent of image information that has not been converted to text information in step S1538.

After all objects in a message have been processed as described with respect to steps S1533 through S1540, flow progresses to step S1532 in which CPU 40 determines whether there are more messages for processing. If there are no more messages, then flow terminates.

What is claimed is:

1. Apparatus for transmitting a multimedia message to a recipient, the multimedia message including first type information mixed together with second type information different from the first type information, said apparatus comprising:

a memory for storing at least one of a plurality of different media types which correspond to a receiving mechanism of the recipient, for storing the multimedia message comprising the first type information mixed together with the second type information, and for storing a plurality of different conversion instructions, each one of the conversion instructions for converting the first and second type information into a respective one of the plurality of different media types; and a processor adapted to execute instructions for mixing the first type information and the second type information so as to generate a multimedia message in which the first type information and the second type information are separately identifiable, and adapted to determine whether conversion of the first and/or second type information is necessary based on the at least one media type stored in the memory, and, in a case that conversion is necessary, to select one of the plurality of different conversion instructions for automatically converting the first and/or second type information to one of the plurality of different media types that corresponds to the recipient's receiving mechanism, the selected one of the plurality of different conversion instructions being selected based on a table of permissible and impermissible conversion capabilities and based on the at least one media type stored in the memory, wherein the table of permissible and impermissible conversion capabilities indicates an extent to which it is possible to convert each one of the plurality of different media types into another, different one of the plurality of different media types.

2. Apparatus according to claim 1, wherein the multimedia message generated by said processor includes at least one page of mixed first and second type information, and wherein said processor is adapted to generate map information which identifies the first type and the second type information.

3. Apparatus according to claim 2, wherein the multimedia message generated by said processor includes plural pages, and wherein said processor is adapted to generate link information among the plural pages.

4. Apparatus according to claim 3, further comprising a memory for storing plural multimedia messages, wherein said processor is adapted to generate header information for each of said plural multimedia messages.

5. Apparatus according to claim 4, wherein said processor is adapted to arrange said plural multimedia messages into plural folders.

6. Apparatus according to claim 1, further comprising transmission means for transmitting the multimedia message.

7. Apparatus according to claim 6, wherein said transmission means is selected from the group consisting of a facsimile interface, a modem, and a voice telephone.

8. Apparatus according to claim 6, further comprising second transmission means different from said transmission means for transmitting the multimedia message.

9. Apparatus according to claim 8, wherein said transmission means comprises a modem and said second transmission means comprises a facsimile interface and wherein said instructions are adapted to convert text type information into image type information.

10. Apparatus according to claim 9, wherein said instructions are further adapted to convert image type information into text type information.

11. Apparatus according to claim 9, further comprising a voice synthesizer connected to the voice telephone, wherein said instructions are adapted to convert text type information into voice type information.

12. Apparatus according to claim 6, further comprising scheduling means for scheduling transmission of the multimedia message by said transmission means.

13. Apparatus according to claim 6, wherein said transmission means is adapted to receive commands from a telephone interface and wherein said processor is adapted to process the commands received by said transmission means.

14. Apparatus according to claim 13, wherein said processor is adapted to cause transmission of a multimedia message in accordance with the processed commands.

15. Apparatus according to claim 13, wherein the commands are DTMF signals on the telephone interface.

16. Apparatus according to claim 1, further comprising first input means and second input means different from said first input means, said first and second input means for inputting first type information and second type information, respectively.

17. Apparatus according to claim 16, wherein said first and second input means are selected from the group consisting of a scanner, a video interface, a text keyboard, and a microphone.

18. Apparatus according to claim 1, further comprising a display for displaying the multimedia message, wherein said processor mixes the first type information and the second type information such that the multimedia message formed by said processor is adapted for multimedia display on said display.

19. Apparatus according to claim 18, further comprising edit means for editing the multimedia message.

20. Apparatus according to claim 19, further comprising a host computer interface for exchanging information with a host computer, wherein said edit means is adapted to edit the exchanged information.

21. An apparatus according to claim 1, wherein the apparatus transmits the multimedia message to a plurality of recipients; and wherein the processor determines whether conversion of the first and/or second type information is necessary for each of the plurality of recipients based on the at least one media type stored in the memory, and, in cases where conversion is necessary, the processor selects one or more of the plurality of conversion instructions to automatically convert, for each of the plurality of recipients, the first and/or second type information into one of a plurality of different delivery media types that corresponds to the recipient's receiving mechanism.

22. An apparatus according to claim 21, further comprising a message transmission queue;

wherein converted messages for each of the plurality of recipients are stored in the message transmission queue, and each message is transmitted to a recipient's receiving mechanisms at a scheduled time.

23. Multimedia message system for transmitting a multimedia message to a recipient, comprising:

a memory for storing at least one of a plurality of different media types which correspond to a receiving mechanism of the recipient, for storing a multimedia message having at least one page that includes first type information mixed with second type information different from the first type information such that the first and second types are separately identifiable, and for storing a plurality of different conversion instructions, each one of the conversion instructions for converting a respective one of the first and second type information into a respective one of the plurality of different media types;

a processor adapted to execute instructions for mixing the first type information and the second type information so as to generate a multimedia message in which the first type information and the second type information are separately identifiable, and adapted to determine whether conversion of the first and/or second type information is necessary based on the at least one media type stored in the memory, and, in a case that conversion is necessary, to select one of the plurality of different conversion instructions for automatically converting the first and/or second type information to one of the plurality of different media types that corresponds to the recipient's receiving mechanism, the selected one of the plurality of different conversion instructions being selected based on a table of permissible and impermissible conversion capabilities and based on the at least one media type stored in the memory, wherein the table of permissible and impermissible conversion capabilities indicates an extent to which it is possible to convert each one of the plurality of different media types into another, different one of the plurality of different media types; and transmission means for transmitting the converted multimedia message to the recipient.

24. A system according to claim 23, wherein said transmission means is selected from the group consisting of facsimile interface, a modem, and a voice telephone.

25. A system according to claim 23, further comprising second transmission means different from said transmission means for transmitting the multimedia message stored in said memory.

26. A system according to claim 25, wherein said transmission means comprises a modem and said second transmission means comprises a facsimile interface and wherein said processor is adapted to convert text type information into image type information.

27. A system according to claim 26, wherein said processor is further adapted to convert image type information into text type information.

28. A system according to claim 26, further comprising a voice synthesizer connected to the voice telephone, wherein said processor is adapted to convert text type information into voice type information.

29. A system according to claim 23, further comprising scheduling means for scheduling transmission of the multimedia message by said transmission means.

30. A system according to claim 23, wherein said transmission means is adapted to receive commands from the telephone interface and further comprising process means for processing the commands received by said transmission means.

31. A system according to claim 30, wherein said process means is adapted to cause transmission of a multimedia message in accordance with the processed commands.

32. A system according to claim 30, wherein the commands are DTMF signals on the telephone interface.

33. A system according to claim 23, wherein said memory is adapted to store map information which identifies the first type information and the second type information in said at least one page.

34. A system according to claim 33, wherein said memory is adapted to store multimedia messages comprising plural pages and to store link information among the plural pages.

35. A system according to claim 34, wherein said memory is adapted to store plural multimedia messages, and to store header information for each of said plural multimedia messages.

36. A system according to claim 23, further comprising first input means and second input means different from said first input means, said first and second input means for inputting first type information and second type information, respectively, and process means adapted to execute instructions for processing the first and second type information input by said first and second input means into a multimedia message and for causing said memory to store the multimedia message.

37. A system according to claim 36, wherein said first and second input means are selected from the group consisting of a scanner, a video interface, a text keyboard, and a microphone.

38. A system according to claim 37, further comprising display means for displaying the multimedia message.

39. A system according to claim 38, further comprising edit means for editing the multimedia message.

40. A system according to claim 39, further comprising a host computer interface for exchanging information with a host computer, wherein said edit means is adapted to edit the exchanged information.

41. An apparatus according to claim 23, wherein the apparatus transmits the multimedia message to a plurality of recipients; and wherein the processor determines whether conversion of the first and/or second type information is necessary for each of the plurality of recipients based on the at least one media type stored in the memory, and, in cases where conversion is necessary, the processor selects one or more of the plurality of conversion instructions to automatically convert, for each of the plurality of recipients, the first and/or second type information into one of a plurality of different delivery media types that corresponds to the recipient's receiving mechanism.

42. An apparatus according to claim 41, further comprising a message transmission queue;

wherein converted messages for each of the plurality of recipients are stored in the message transmission queue, and each message is transmitted to a recipient's receiving mechanisms at a scheduled time.

43. Apparatus for sending and receiving multimedia messages, comprising:

first input means for inputting first type information;

second input means for inputting second type information different from the first type information;

a memory for storing at least one of a plurality of different media types which correspond to a receiving mechanism of a recipient, for storing the first type information mixed together with the second type information, and for storing a plurality of different conversion instructions, each one of the conversion instructions for converting a respective one of the first and second type information into a respective one of the plurality of different media types;

process means adapted to execute instructions for mixing the first type information and the second type information so as to generate a multimedia message in which the first type information and the second type information are separately identifiable, and adapted to determine whether conversion of the first and/or second type information is necessary based on the at least one media type stored in the memory, and, in a case that conversion is necessary, to select one of the plurality of different conversion instructions for automatically converting the first and/or second type information to one of the plurality of different media types that corresponds to the recipient's receiving mechanism, the selected one of the plurality of different conversion instructions being selected based on a table of permissible and impermissible conversion capabilities and based on the at least one media type stored in the memory, wherein the table of permissible and impermissible conversion capabilities indicates an extent to which it is possible to convert each one of the plurality of different media types into another, different one of the plurality of different media types;

said memory having at least one folder for storing the multimedia message generated by said process means; and transmission means for transmitting the converted multimedia message to a transmission interface and for receiving a multimedia message from the transmission interface, wherein the multimedia message received by said transmission means is stored in said memory.

44. Apparatus according to claim 43, wherein the multimedia message generated by said processor includes at least one page of mixed first and second type information, and wherein said process means is adapted to generate map information which identifies the first type information and the second type information and to store the map information in said memory.

45. Apparatus according to claim 44, wherein the multimedia message generated by said process means includes plural pages, and wherein said process means is adapted to generate link information among the plural pages and to store the link information is said memory.

46. Apparatus according to claim 45, wherein said process means is adapted to generate header information for the multimedia message and to store the header information in said memory.

47. Apparatus according to claim 46, wherein said memory includes a second folder and wherein the multimedia message received by said transmission means is stored in the second folder.

48. Apparatus according to claim 43, wherein said transmission means is selected from the group consisting of facsimile interface, a modem, and a voice telephone.

49. Apparatus according to claim 43, further comprising second transmission means different from said transmission means for transmitting a multimedia message stored said memory.

50. Apparatus according to claim 49, wherein said transmission means comprises a modem and said second transmission means comprises a facsimile interface and wherein said process means is adapted to convert text type information into image type information.

51. Apparatus according to claim 50, wherein said process means is further adapted to convert image type information into text type information.

52. Apparatus according to claim 50, further comprising a voice synthesizer connected to the voice telephone, wherein said process means is adapted to convert text type information into voice type information.

53. Apparatus according to claim 43, further comprising scheduling means for scheduling transmission of the multimedia message by said transmission means.

54. Apparatus according to claim 43, wherein said transmission means is adapted to receive commands from a telephone interface and wherein said process means is adapted to process the commands received by said transmission means.

55. Apparatus according to claim 54, wherein said process means is adapted to cause transmission of the multimedia message stored in said memory in accordance with the processed command.

56. Apparatus according to claim 54, wherein the commands are DTMF signals on the telephone interface.

57. Apparatus according to claim 43, wherein said first and second input means are selected from the group consisting of a scanner, a video interface, a text keyboard and a microphone.

58. Apparatus according to claim 57, further comprising a display for displaying the multimedia message.

59. Apparatus according to claim 58, further comprising edit means for editing the multimedia message.

60. Apparatus according to claim 59, further comprising a host computer interface for exchanging information with a host computer wherein said edit means is adapted to edit the exchanged information.

61. Apparatus according to claim 43, further comprising second transmission means for transmitting a multimedia message stored in said memory to the telephone interface.

62. Apparatus according to claim 61, further comprising a network control unit for selectively connecting the telephone interface to said transmission means or said second transmission means in accordance with message characteristics on the telephone interface.

63. Apparatus according to claim 62, wherein said transmission means and said second transmission means are selected from the group consisting of a facsimile interface, a modem and a voice digitizer.

64. An apparatus according to claim 43, wherein the apparatus transmits the multimedia message to a plurality of recipients; and wherein the process means determines whether conversion of the first and/or second type information is necessary for each of the plurality of recipients based on the at least one media type stored in the memory, and, in cases where conversion is necessary, the processor selects one or more of the plurality of conversion instructions to automatically convert, for each of the plurality of recipients, the first and/or second type information into one of a plurality of different delivery media types that corresponds to the recipient's receiving mechanism.

65. An apparatus according to claim 64, further comprising a message transmission queue;

wherein converted messages for each of the plurality of recipients are stored in the message transmission queue, and each message is transmitted to a recipient's receiving mechanisms at a scheduled time.

66. A multimedia message handling apparatus comprising:

a keyboard for inputting text information;

a microphone for inputting voice information;

a scanner for inputting image information;

binary means for inputting binary information;

a processor for mixing at least two of text information, voice information, image information, binary information and OLE information to generate a multimedia message having such different types of information in separately identifiable form;

a memory for storing the multimedia message comprising the at least two of text information, voice information, image information, binary information and OLE information;

a facsimile interface for sending and receiving image information through a telephone interface, wherein, in a case that a recipient's receiving mechanism receives image information, said processor selects one image-producing conversion routine from among plural conversion routines and executes the selected image-producing conversion routine so as to automatically convert each different type of information in the multimedia message to image information prior to transmitting the multimedia message through the facsimile interface, the selected image-producing conversion routine being selected based on a table of permissible and impermissible conversion capabilities, wherein the table of permissible and impermissible conversion capabilities indicates an extent to which it is possible to convert each one of the plurality of different information types into another, different one of the plurality of different information types;

a voice synthesizer/digitizer for sending and receiving voice information through a telephone interface, wherein, in a case that the recipient's receiving mechanism receives voice information, said processor selects one voice-producing conversion routine from among the plural conversion routines and executes the selected voice-producing conversion routine so as to automatically convert each different type of information in the multimedia message to voice information prior to transmitting the multimedia message through the telephone interface, the selected voice-producing conversion routine being selected based on the table of permissible and impermissible conversion capabilities;

a modem for sending and receiving image information, text information, voice information and binary information, mixed together in multimedia messages, through the telephone interface, wherein received multimedia messages are stored in said memory; and a network control unit for selectively connecting the telephone interface to the facsimile interface, the voice synthesizer/digitizer, or the modem in accordance with the message characteristics on the telephone interface.

67. Apparatus according to claim 66, wherein said processor generates map information which identifies the text information, the voice information, the image information, the binary information and the OLE information in a multimedia message.

68. Apparatus according to claim 67, wherein said processor generates link information among plural pages of a multimedia message.

69. Apparatus according to claim 68, wherein said processor generates header information for a multimedia message.

70. Apparatus according to claim 66, wherein said processor is adapted to convert text information into image information.

71. Apparatus according to claim 70, wherein said processor is further adapted to convert image information into text information.

72. Apparatus according to claim 71, wherein said processor is adapted to convert text information into voice information.

73. Apparatus according to claim 66, further comprising scheduling means for scheduling transmission of the multimedia message.

74. Apparatus according to claim 66 wherein said processor receives commands from the telephone interface.

75. Apparatus according to claim 74, wherein said processor causes transmission of a multimedia message in accordance with the processed commands.

76. Apparatus according to claim 74, wherein the commands are received from the voice digitizer/synthesizer in the form of DTMF signals.

77. Apparatus according to claim 66, further comprising display means for displaying the multimedia message.

78. Apparatus according to claim 77, further comprising edit means for editing the multimedia message.

79. Apparatus according to claim 78, further comprising a host computer interface for exchanging information with a host computer, wherein said edit means is adapted to edit the exchanged information.

80. Apparatus according to claim 77, wherein said keyboard is displayed by said display means.

81. An apparatus according to claim 66, further comprising a message transmission queue;

wherein each converted message is stored in the message transmission queue, and each message is transmitted from the message transmission queue to a recipient's receiving mechanism at a scheduled time.

82. A method for transmitting a multimedia message to a recipient, the multimedia message including first type information and second type information different from the first type information, said method comprising the steps of:

storing at least one of a plurality of different media types which correspond to a receiving mechanism of the recipient;

storing the first type information mixed together with the second type information, and storing a plurality of different conversion instructions, each one of the conversion instructions for converting the first and second type information into a respective one of the plurality of different media types;

mixing the first type information and the second type information to generate a multimedia message in which the first type information and the second type information are separately identifiable;

determining whether conversion of the first and/or second types of information is required based on the at least one media type stored in the storing step;

selecting, in a case that conversion is required, one of the plurality of different conversion instructions based on a table of permissible and impermissible conversion capabilities and based on the at least one media type stored in the storing step, wherein the table of permissible and impermissible conversion capabilities indicates an extent to which it is possible to convert each one of the plurality of different media types into another, different one of the plurality of different media types; and executing the selected one of the conversion instructions so as to automatically convert the first and/or second type information to one of the plurality of different media types that corresponds to the recipient's receiving mechanism.

83. A method according to claim 82, wherein the multimedia message includes at least one page of mixed first and second type information, and further comprising the step of generating map information which identifies the first type and the second type information.

84. A method according to claim 83, wherein the multimedia message includes plural pages, further comprising the step of generating link information among the plural pages.

85. A method according to claim 84, further comprising the step of storing plural multimedia messages and generating header information for each of said plural multimedia messages.

86. A method according to claim 85, further comprising the step of arranging said plural multimedia messages into plural folders.

87. A method according to claim 82, further comprising the step of transmitting the multimedia message.

88. A method according to claim 87, wherein the multimedia message is transmitted via a medium selected from the group consisting of a facsimile interface, a modem, and a voice telephone.

89. A method according to claim 87, further comprising the step of providing at least two transmission media different from each other for transmitting the multimedia message.

90. A method according to claim 89, wherein said at least two transmission media are a modem and a facsimile interface, respectively, and wherein said converting step converts text type information into image type information.

91. A method according to claim 89, wherein said at least two transmission media are a modem and a facsimile interface, respectively, and wherein said converting step converts image type information into text type information.

92. A method according to claim 90, further comprising the step of converting text type information into voice type information.

93. A method according to claim 87, further comprising the step of scheduling transmission of the multimedia message.

94. A method according to claim 87, further comprising the step of receiving commands from a telephone interface and processing the commands so received.

95. A method according to claim 94, further comprising the step of transmitting a multimedia message in accordance with the processed commands.

96. A method according to claim 94, wherein the commands are DTMF signals on the telephone interface.

97. A method according to claim 82, further comprising the step of inputting first type information and second type information different from said first type information.

98. A method according to claim 97, wherein said first and second type information is input from a medium selected from the group consisting of a scanner, a video interface, a text keyboard, and a microphone.

99. A method according to claim 82, further comprising the step of displaying the multimedia message.

100. A method according to claim 99, further comprising the step of editing the multimedia message.

101. A method according to claim 100, further comprising the step of exchanging information with a host computer and editing the exchanged information.

102. A method according to claim 82, wherein the method is able to transmit the multimedia message to a plurality of recipients; and wherein, in a case that the multimedia message is to be transmitted to a plurality of recipients, the method further comprises the steps of:
determining whether conversion of the first and/or second type information is necessary for each of the plurality of recipients based on the at least one media type stored in the storing step; and
selecting, in cases where conversion is necessary, one or more of the plurality of conversion instructions to automatically convert, for each of the plurality of recipients, the first and/or second type information into one of a plurality of different delivery media types that corresponds to the recipient's receiving mechanism.

103. A method according to claim 102, further comprising the steps of:
storing converted messages for each of the plurality of recipients in a message transmission queue; and
transmitting each message stored in the message transmission queue to a recipient's receiving mechanism at a scheduled time.

104. A method of transmitting a multimedia message to a recipient, comprising the steps of:
storing at least one of a plurality of different media types which correspond to a receiving mechanism of the recipient;
storing a multimedia message having at least one page that includes first type information mixed with second type information different from the first type information such that the first and second types are separately identifiable;
storing a plurality of different conversion instructions, each one of the conversion instructions for converting the first and second type information into a respective one of the plurality of different media types;
determining whether conversion of the first and/or second types of information is required based on the at least one media type stored in the storing step;
selecting, in a case that conversion is required, one of the plurality of different conversion instructions based on a table of permissible and impermissible conversion capabilities and based on the at least one media type stored in the storing step, wherein the table of permissible and impermissible conversion capabilities indicates an extent to which it is possible to convert each one of the plurality of different media types into another, different one of the plurality of different media types;
executing the selected one of the conversion instructions so as to automatically convert the first and/or second type information to one of the plurality of different media types that corresponds to the recipient's receiving mechanism; and
transmitting the converted multimedia message to the recipient.

105. A method according to claim 104, wherein said multimedia message is transmitted via a medium selected from the group consisting of facsimile interface, a modem, and a voice telephone.

106. A method according to claim 104, further comprising the step of providing at least two transmission media different from each other for transmitting the stored multimedia message.

107. A method according to claim 106, wherein said at least two transmission media comprise a modem and a facsimile interface, respectively, and wherein said converting step converts text type information into image type information.

108. A method according to claim 106, wherein said at least two transmission media comprise a modem and a facsimile interface, respectively, and wherein said converting step converts image type information into text type information.

109. A method according to claim 107, further comprising the step of converting text type information into voice type information in said converting step.

110. A method according to claim 104, further comprising the step of scheduling transmission of the multimedia message.

111. A method according to claim 104, further comprising the step of receiving commands from a telephone interface and processing the commands so received.

112. A method according to claim 111, further comprising the step of transmitting a multimedia message in accordance with the processed commands.

113. A method according to claim 111, wherein the commands are DTMF signals on the telephone interface.

114. A method according to claim 104, wherein said storing step stores map information which identifies the first type information and the second type information in said at least one page.

115. A method according to claim 114, wherein said storing step stores multimedia messages comprising plural pages and also stores link information among the plural pages.

116. A method according to claim 115, wherein said storing step stores plural multimedia messages, and also stores header information for each of said plural multimedia messages.

117. A method according to claim 104, further comprising the steps of:

inputting first type information and second type information different from said first type information;

processing the first and second type information into a multimedia message; and storing the multimedia message.

118. A method according to claim 117, wherein said first and second type information is input via a medium selected from the group consisting of a scanner, a video interface, a text keyboard, and a microphone.

119. A method according to claim 118, further comprising the step of displaying the multimedia message on a display.

120. A method according to claim 119, further comprising the step of editing the multimedia message.

121. A method according to claim 120, further comprising the step of exchanging information with a host computer and editing the exchanged information.

122. A method according to claim 104, wherein the method is able to transmit the multimedia message to a plurality of recipients; and wherein, in a case that the multimedia message is to be transmitted to a plurality of recipients, the method further comprises the steps of:

determining whether conversion of the first and/or second type information is necessary for each of the plurality of recipients based on the at least one stored media type; and selecting, in cases where conversion is necessary, one or more of the plurality of conversion instructions to automatically convert, for each of the plurality of recipients, the first and/or second type information into one of a plurality of different delivery media types that corresponds to the recipient's receiving mechanism.

123. A method according to claim 122, further comprising the steps of:

storing converted messages for each of the plurality of recipients in a message transmission queue; and transmitting each message stored in the message transmission queue to a recipient's receiving mechanism at a scheduled time.

124. A method for sending and receiving multimedia messages, comprising the steps of:

inputting first type information;

inputting second type information different from the first type information;

storing at least one of a plurality of different media types which correspond to a receiving mechanism of the recipient;

storing a plurality of different conversion instructions, each one of the conversion instructions for converting the first and second type information into a respective one of the plurality of different media types;

mixing the first type information and the second type information to generate a multimedia message in which the first type information and the second type information are separately identifiable;

storing the multimedia message;

determining whether conversion of the first and/or second types of information is required based on the at least one media type stored in the storing step;

selecting, in a case that conversion is required, one of the plurality of different conversion instructions based on a table of permissible and impermissible conversion capabilities and based on the at least one media type stored in the storing step, wherein the table of permissible and impermissible conversion capabilities indicates an extent to which it is possible to convert each one of the plurality of different media types into another, different one of the plurality of different media types;

executing the selected one of the conversion instructions so as to automatically convert the first and/or second type information to one of the plurality of different media types that corresponds to the recipient's receiving mechanism;

transmitting the converted multimedia message to a transmission interface; and receiving a multimedia message from the transmission interface, wherein the received multimedia message is stored.

125. A method according to claim 124, wherein the multimedia message includes at least one page of mixed first and second type information, further comprising the step of generating map information which identifies the first type information and the second type information and storing the map information.

126. A method according to claim 125, wherein the multimedia message includes plural pages, further comprising the step of generating link information among the plural pages and storing the link information.

127. A method according to claim 126, further comprising the step of generating header information for the multimedia message and storing the header information.

128. A method according to claim 127, further comprising the step of storing received multimedia messages in a second folder.

129. A method according to claim 124, wherein said multimedia messages are transmitted over a medium selected from the group consisting of facsimile interface, a modem, and a voice telephone.

130. A method according to claim 124, further comprising the step of providing at least two transmission media different from each other for transmitting a stored multimedia message.

131. A method according to claim 130, wherein said at least two transmission media are a modem and a facsimile interface, respectively, and wherein said converting step converts text type information into image type information.

132. A method according to claim 130, wherein said at least two transmission media are a modem and a facsimile interface, respectively, and wherein said converting step converts image type information into text type information.

133. A method according to claim 131, further comprising the step of converting text type information into voice type information.

134. A method according to claim 124, further comprising the step of scheduling transmission of the multimedia message.

135. A method according to claim 124, further comprising the step of receiving commands from a telephone interface and processing the commands so received.

136. A method according to claim 135, further comprising the step of transmitting the stored multimedia message in accordance with the processed command.

137. A method according to claim 135, wherein the commands are DTMF signals on the telephone interface.

138. A method according to claim 124, wherein said first and second type information are input from a medium selected from the group consisting of a scanner, a video interface, a text keyboard and a microphone.

139. A method according to claim 138, further comprising the step of displaying the multimedia message.

140. A method according to claim 139, further comprising the step of editing the multimedia message.

141. A method according to claim 140, further comprising the step of exchanging information with a host computer and editing the exchanged information.

142. A method according to claim 130, further comprising the step of selectively connecting a telephone interface to one of said at least two transmission media in accordance with message characteristics on the telephone interface.

143. A method according to claim 142, wherein said at least two transmission media are selected from the group consisting of a facsimile interface, a modem and a voice digitizer.

144. A method according to claim 124, wherein the method is able to transmit the multimedia message to a plurality of recipients; and wherein, in a case that the multimedia message is to be transmitted to a plurality of recipients, the method further comprises the steps of:

determining whether conversion of the first and/or second type information is necessary for each of the plurality of recipients based on the at least one stored media type; and selecting, in cases where conversion is necessary, one or more of the plurality of conversion instructions to automatically convert, for each of the plurality of recipients, the first and/or second type information into one of a plurality of different delivery media types that corresponds to the recipient's receiving mechanism.

145. A method according to claim 144, further comprising the steps of:

storing converted messages for each of the plurality of recipients in a message transmission queue; and transmitting each message stored in the message transmission queue to a recipient's receiving mechanism at a scheduled time.

146. A method for handling a multimedia message, comprising the steps of:

inputting text information on a keyboard;

inputting voice information through a microphone;

inputting image information via a scanner;

inputting binary information;

mixing at least two of text information, voice information, image information, binary information and OLE information to generate a multimedia message in which the different types of information are separately identifiable;

storing the multimedia message comprising the at least two of text information, voice information, image information, binary information and OLE information;

sending and receiving image information through a telephone interface, wherein, in a case that a recipient's receiving mechanism receives image information, one image-producing conversion routine is selected from among plural conversion routines and, using the selected image-producing conversion routine, each different type of information in the multimedia message is automatically converted to image information prior to sending the multimedia message, the selected image-producing conversion routine being selected based on a table of permissible and impermissible conversion capabilities, wherein the table of permissible and impermissible conversion capabilities indicates an extent to which it is possible to convert each one of the plurality of different information types into another, different one of the plurality of different information types;

sending and receiving voice information through a telephone interface, wherein, in a case that the recipient's receiving mechanism receives voice information, one voice-producing conversion routine is selected from among the plural conversion routines and, using the selected voice-producing conversion routine, each different type of information in the multimedia message is automatically converted to voice information prior to sending the multimedia message, the selected voice-producing conversion routine being selected based on the table of permissible and impermissible conversion capabilities;

sending and receiving image information, text information, voice information and binary information mixed together in multimedia messages, through the telephone interface, wherein received multimedia messages are stored; and selectively connecting the telephone interface to a facsimile interface, a voice synthesizer/digitizer, or a modem in accordance with the message characteristics.

147. A method according to claim 146, further comprising the step of generating map information which identifies the text information, the voice information, the image information, the binary information and the OLE information in a multimedia message.

148. A method according to claim 147, further comprising the step of generating link information among plural pages of a multimedia message.

149. A method according to claim 148, further comprising the step of generating header information for a multimedia message.

150. A method according to claim 146, wherein text information is converted into image information.

151. A method according to claim 146, wherein image information is converted into text information.

152. A method according to claim 151, wherein text information is converted into voice information.

153. A method according to claim 146, further comprising the step of scheduling transmission of the multimedia message.

154. A method according to claim 146, further comprising the step of receiving commands from the telephone interface.

155. A method according to claim 154, further comprising the step of transmitting a multimedia message in accordance with the received commands.

156. A method according to claim 154, wherein the commands are received from the voice digitizer/synthesizer in the form of DTMF signals.

157. A method according to claim 146, further comprising the step of displaying the multimedia message.

158. A method according to claim 157, further comprising the step of editing the multimedia message.

159. A method according to claim 158, further comprising the step of exchanging information with a host computer and editing the exchanged information.

160. A method according to claim 146, further comprising the steps of:

storing each converted messages in a message transmission queue; and transmitting each message stored in the message transmission queue to a recipient's receiving mechanism at a scheduled time.

161. Computer-executable process steps stored on a computer-readable medium, the computer executable process steps to transmit a multimedia message to a recipient, the multimedia message including first type information and second type information different from the first type, said computer-executable process steps comprising:

code to store at least one of a plurality of different media types which correspond to a receiving mechanism of the recipient, and to store the first type information mixed together with the second type information, and to store a plurality of different conversion instructions, each one of the conversion instructions for converting the first and second type information into a respective one of the plurality of different media types;

code to mix the first type information and the second type information to generate a multimedia message in which the first type information and the second type information are separately identifiable;

code to determine whether conversion of the first and/or second types of information is required based on the at least one stored media type;

code to select, in a case that conversion is required, one of the plurality of different conversion instructions based on a table of permissible and impermissible conversion capabilities and based on the at least one stored media type, wherein the table of permissible and impermissible conversion capabilities indicates an extent to which it is possible to convert each one of the plurality of different media types into another, different one of the plurality of different media types; and code to execute the selected one of the conversion instructions so as to automatically convert the first and/or second type information to one of the plurality of different media types that corresponds to the recipient's receiving mechanism.

162. Computer-executable process steps according to claim 161, wherein the multimedia message includes the at least one page of mixed first and second type information, and further comprising code to generate map information which identifies the first type and the second type information.

163. Computer-executable process steps according to claim 162, wherein the multimedia message includes plural pages, and further comprising code to generate link information among the plural pages.

164. Computer-executable process steps according to claim 163, further comprising code to store plural multimedia messages and to generate header information for each of said plural multimedia messages.

165. Computer-executable process steps according to claim 164, further comprising code to arrange said plural multimedia messages into plural folders.

166. Computer-executable process steps according to claim 161, further comprising code to transmit the multimedia message.

167. Computer-executable process steps according to claim 166, wherein the multimedia message is transmitted via a medium selected from the group consisting of a facsimile interface, a modem, and a voice telephone.

168. Computer-executable process steps according to claim 166, further comprising code to provide at least two transmission media different from each other for transmitting the multimedia message.

169. Computer-executable process steps according to claim 168, wherein said at least two transmission media are a modem and a facsimile interface, respectively, and wherein said code to convert converts text type information into image type information.

170. Computer-executable process steps according to claim 168, wherein said at least two transmission media are a modem and a facsimile interface, respectively, and wherein said code to convert converts image type information into text type information.

171. Computer-executable process steps according to claim 169, further comprising code to convert text type information into voice type information.

172. Computer-executable process steps according to claim 166, further comprising code to schedule transmission of the multimedia message.

173. Computer-executable process steps according to claim 166, further comprising code to receive commands from a telephone interface and to process the commands so received.

174. Computer-executable process steps according to claim 166, further comprising code to transmit a multimedia message in accordance with the processed commands.

175. Computer-executable process steps according to claim 173, wherein the commands are DTMF signals on the telephone interface.

176. Computer-executable process steps according to claim 161, further comprising code to input first type information and second type information different from said first type information.

177. Computer-executable process steps according to claim 176, wherein said first and second type information is input from a medium selected from the group consisting of a scanner, a video interface, a text keyboard and a microphone.

178. Computer-executable process steps according to claim 161, further comprising code to display the multimedia message.

179. Computer-executable process steps according to claim 178, further comprising code to edit the multimedia message.

180. Computer-executable process steps according to claim 179, further comprising code to exchange information with a host computer and to edit the exchanged information.

181. Computer-executable process steps according to claim 161, further comprising process steps to transmit the multimedia message to a plurality of recipients; and wherein, in a case that the multimedia message is to be transmitted to a plurality of recipients, the process steps further comprise:

code to determine whether conversion of the first and/or second type information is necessary for each of the plurality of recipients based on the at least one stored media type; and code to select, in cases where conversion is necessary, one or more of the plurality of conversion instructions to automatically convert, for each of the plurality of recipients, the first and/or second type information into one of a plurality of different delivery media types that corresponds to the recipient's receiving mechanism.

182. Computer-executable process steps according to claim 181, further comprising:

code to store converted messages for each of the plurality of recipients in a message transmission queue; and code to transmit each message stored in the message transmission queue to a recipient's receiving mechanism at a scheduled time.

183. Computer-executable process steps stored on a computer-readable medium, the computer executable process steps to transmit a multimedia message to a recipient, said computer-executable process steps comprising:

code to store at least one of a plurality of different media types which correspond to a receiving mechanism of the recipient, and to store a multimedia message having at least one page that includes first type information mixed with second type information different from the first type information such that the first and second types are separately identifiable;

code to store a plurality of different conversion instructions, each one of the conversion instructions for converting the first and second type information into a respective one of the plurality of different media types;

code to determine whether conversion of the first and/or second types of information is required based on the at least one stored media type;

code to select, in a case that conversion is required, one of the plurality of different conversion instructions based on a table of permissible and impermissible conversion capabilities and based on the at least one stored media type, wherein the table of permissible and impermissible conversion capabilities indicates an extent to which it is possible to convert each one of the plurality of different media types into another, different one of the plurality of different media types;

code to execute the selected one of the conversion instructions so as to automatically convert the first and/or second type information to one of the plurality of different media types that corresponds to the recipient's receiving mechanism; and code to transmit the converted multimedia message to the recipient.

184. Computer-executable process steps according to claim 183, wherein said multimedia message is transmitted via a medium selected from the group consisting of facsimile interface, a modem, and a voice telephone.

185. Computer-executable process steps according to claim 183, further comprising code to provide at least two transmission media different from each other for transmitting the stored multimedia message.

186. Computer-executable process steps according to claim 185, wherein said at least two transmission media comprise a modem and a facsimile interface, respectively, and wherein said code to convert converts text type information into image type information.

187. Computer-executable process steps according to claim 186, further comprising code to convert text type information into voice type information.

188. Computer-executable process steps according to claim 185, wherein said at least two transmission media comprise a modem and a facsimile interface, respectively, and wherein said code to convert converts image type information into text type information.

189. Computer-executable process steps according to claim 183, further comprising code to schedule transmission of the multimedia message.

190. Computer-executable process steps according to claim 183, further comprising code to receive commands from a telephone interface and to process the commands so received.

191. Computer-executable process steps according to claim 190, further comprising code to transmit a multimedia message in accordance with the processed commands.

192. Computer-executable process steps according to claim 190, wherein the commands are DTMF signals on the telephone interface.

193. Computer-executable process steps according to claim 183, wherein said code to store stores map information which identifies the first type information and the second type information in said at least one page.

194. Computer-executable process steps according to claim 193, wherein said code to store stores multimedia messages comprising plural pages and also stores link information among the plural pages.

195. Computer-executable process steps according to claim 194, wherein said code to store stores plural multimedia messages, and also stores header information for each of said plural multimedia messages.

196. Computer-executable process steps according to claim 183, further comprising:

code to input first type information and second type information different from said first type information;

code to process the first and second type information into a multimedia message; and code to store the multimedia message.

197. Computer-executable process steps according to claim 196, wherein said first and second type information is input via a medium selected from the group consisting of a scanner, a video interface, a text keyboard and a microphone.

198. Computer-executable process steps according to claim 197, further comprising code to display the multimedia message on a display.

199. Computer-executable process steps according to claim 198, further comprising code to edit the multimedia message.

200. Computer-executable process steps according to claim 199, further comprising code to exchange information with a host computer and to edit the exchanged information.

201. Computer-executable process steps according to claim 183, further comprising process steps to transmit the multimedia message to a plurality of recipients; and wherein, in a case that the multimedia message is to be transmitted to a plurality of recipients, the process steps further comprise:

code to determine whether conversion of the first and/or second type information is necessary for each of the plurality of recipients based on the at least one stored media type; and code to select, in cases where conversion is necessary, one or more of the plurality of conversion instructions to automatically convert, for each of the plurality of recipients, the first and/or second type information into one of a plurality of different delivery media types that corresponds to the recipient's receiving mechanism.

202. Computer-executable process steps according to claim 201, further comprising:

code to store converted messages for each of the plurality of recipients in a message transmission queue; and code to transmit each message stored in the message transmission queue to a recipient's receiving mechanism at a scheduled time.

203. Computer-executable process steps stored on a computer-readable medium, the computer executable process steps to send and receive multimedia messages, said computer-executable process steps comprising:

code to input first type information;

code to input second type information different from the first type information;

code to store at least one of a plurality of different media types which correspond to a receiving mechanism of the recipient, and to store a plurality of different conversion instructions, each one of the conversion instructions for converting the first and second type information into a respective one of the plurality of different media types;

code to mix the first type information and the second type information to generate a multimedia message in which the first type information and the second type information are separately identifiable;

code to store the multimedia message;

code to determine whether conversion of the first and/or second types of information is required based on the at least one stored media type;

code to select, in a case that conversion is required, one of the plurality of different conversion instructions based on a table of permissible and impermissible conversion capabilities and based on the at least one stored media type, wherein the table of permissible and impermissible conversion capabilities indicates an extent to which it is possible to convert each one of the plurality of different media types into another, different one of the plurality of different media types;

code to execute the selected one of the conversion instructions so as to automatically convert the first and/or second type information to one of the plurality of different media types that corresponds to the recipient's receiving mechanism;

code to transmit the converted multimedia message to a transmission interface; and code to receive a multimedia message from the transmission interface, wherein the received multimedia message is stored.

204. Computer-executable process steps according to claim 203, wherein the multimedia message includes at least one page of mixed first and second type information, further comprising code to generate map information which identifies the first type information and the second type information and to store the map information.

205. Computer-executable process steps according to claim 204, wherein the multimedia message includes plural pages, further comprising code to generate link information among the plural pages and to store the link information.

206. Computer-executable process steps according to claim 205, further comprising code to generate header information for the multimedia message and to store the header information.

207. Computer-executable process steps according to claim 206, further comprising code to store received multimedia messages in a second folder.

208. Computer-executable process steps according to claim 203, wherein said multimedia messages are transmitted over a medium selected from the group consisting of facsimile interface, a modem, and a voice telephone.

209. Computer-executable process steps according to claim 203, further comprising code to provide at least two transmission media different from each other for transmitting a stored multimedia message.

210. Computer-executable process steps according to claim 209, wherein said at least two transmission media are a modem and a facsimile interface, respectively, and wherein said code to convert converts text type information into image type information.

211. Computer-executable process steps according to claim 209, wherein said at least two transmission media are a modem and a facsimile interface, respectively, and wherein said code to convert converts image type information into text type information.

212. Computer-executable process steps according to claim 210, further comprising code to convert text type information into voice type information.

213. Computer-executable process steps according to claim 203, further comprising code to schedule transmission of the multimedia message.

214. Computer-executable process steps according to claim 203, further comprising code to receive commands from a telephone interface and to process the commands so received.

215. Computer-executable process steps according to claim 214, further comprising code to transmit the stored multimedia message in accordance with the processed command.

216. Computer-executable process steps according to claim 214, wherein the commands are DTMF signals on the telephone interface.

217. Computer-executable process steps according to claim 203, wherein said first and second type information are input from a medium selected from the group consisting of a scanner, a video interface, a text keyboard and a microphone.

218. Computer-executable process steps according to claim 217, further comprising code to display the multimedia message.

219. Computer-executable process steps according to claim 218, further comprising code to edit the multimedia message.

220. Computer-executable process steps according to claim 219, further comprising code to exchange information with a host computer and to edit the exchanged information.

221. Computer-executable process steps according to claim 209, further comprising code to selectively connect the telephone interface to one of said at least two transmission media in accordance with message characteristics on the telephone interface.

222. Computer-executable process steps according to claim 221, wherein said at least two transmission media are selected from the group consisting of a facsimile interface, a modem and a voice digitizer.

223. Computer-executable process steps according to claim 203, further comprising process steps to transmit the multimedia message to a plurality of recipients; and wherein, in a case that the multimedia message is to be transmitted to a plurality of recipients, the process steps comprise:

code to determine whether conversion of the first and/or second type information is necessary for each of the plurality of recipients based on the at least one stored media type; and code to select, in cases where conversion is necessary, one or more of the plurality of conversion instructions to automatically convert, for each of the plurality of recipients, the first and/or second type information into one of a plurality of different delivery media types that corresponds to the recipient's receiving mechanism.

224. Computer-executable process steps according to claim 223, further comprising:

code to store converted messages for each of the plurality of recipients in a message transmission queue; and code to transmit each message stored in the message transmission queue to a recipient's receiving mechanism at a scheduled time.

225. Computer-executable process steps stored on a computer-readable medium, the computer executable process steps to handle a multimedia message, said computer-executable process steps comprising:

code to input text information on a keyboard;

code to input voice information through a microphone;

code to input image information via a scanner;

code to input binary information;

code to mix at least two of text information, voice information, image information, binary information and OLE information to generate a multimedia message in which the different types of information are separately identifiable;

code to store the multimedia message comprising at least two of text information, voice information, image information, binary information and OLE information;

code to send and to receive image information through a telephone interface, wherein, in a case that a recipient's receiving mechanism receives image information, one image-producing conversion routine is selected from among plural conversion routines and, using the selected image-producing conversion routine, each different type of information in the multimedia message is automatically converted to image information prior to sending the multimedia message, the selected image-producing conversion routine being selected based on a table of permissible and impermissible conversion capabilities, wherein the table of permissible and impermissible conversion capabilities indicates an extent to which it is possible to convert each one of the plurality of different information types into another, different one of the plurality of different information types;

code to send and receive voice information through a telephone interface, wherein, in a case that the recipient's receiving mechanism receives voice information, one voice-producing conversion routine is selected from among the plural conversion routines and, using the selected voice-producing conversion routine, each different type of information in the multimedia message is automatically converted to voice information prior to sending the multimedia message, the selected voice-producing conversion routine being selected based on the table of permissible and impermissible conversion capabilities;

code to send and to receive image information, text information, voice information and binary information, mixed together in multimedia messages, through the telephone interface, wherein received multimedia messages are stored; and code to selectively connect the telephone interface to a facsimile interface, a voice synthesizer/digitizer, or a modem in accordance with the message characteristics.

226. Computer-executable process steps according to claim 225, further comprising code to generate map information which identifies the text information, the voice information, the image information, the binary information and the OLE information in a multimedia message.

227. Computer-executable process steps according to claim 226, further comprising code to generate link information among plural pages of a multimedia message.

228. Computer-executable process steps according to claim 227, further comprising code to generate header information for a multimedia message.

229. Computer-executable process steps according to claim 225, further comprising code to convert first type information into second type information.

230. Computer-executable process steps according to claim 225, wherein text information is converted into image information.

231. Computer-executable process steps according to claim 225, wherein said image information is converted into text information.

232. Computer-executable process steps according to claim 231, wherein said text information is converted into voice information.

233. Computer-executable process steps according to claim 225, further comprising code to schedule transmission of the multimedia message.

234. Computer-executable process steps according to claim 225, further comprising code to receive commands from the telephone interface.

235. Computer-executable process steps according to claim 234, further comprising code to transmit a multimedia message in accordance with the received commands.

236. Computer-executable process steps according to claim 234, wherein the commands are received from the voice digitizer/synthesizer in the form of DTMF signals.

237. Computer-executable process steps according to claim 225, further comprising code to display the multimedia message.

238. Computer-executable process steps according to claim 237, further comprising code to edit the multimedia message.

239. Computer-executable process steps according to claim 238, further comprising code to exchange information with a host computer and to edit the exchanged information.

240. Computer-executable process steps according to claim 225, further comprising:

code to store each converted messages in a message transmission queue; and code to transmit each message stored in the message transmission queue to a recipient's receiving mechanism at a scheduled time.

241. A computer-readable medium which stores computer-executable process steps, the computer-executable process steps to transmit a multimedia message to a recipient, the multimedia message including first type information and second type information different from the first type information, the computer-executable process steps comprising:

a storing step to store at least one of a plurality of different media types which correspond to a receiving mechanism of the recipient, to store the first type information mixed together with the second type information, and to store a plurality of different conversion instructions, each one of the conversion instructions for converting the first and second type information into a respective one of the plurality of different media types;

a mixing step to mix the first type information and the second type information to generate a multimedia message in which the first type information and the second type information are separately identifiable;

a determining step to determine whether conversion of the first and/or second types of information is required based on the at least one media type stored in the storing step;

a selecting step to select, in a case that conversion is required, one of the plurality of different conversion instructions based on a table of permissible and impermissible conversion capabilities and based on the at least one media type stored in the storing step, wherein the table of permissible and impermissible conversion capabilities indicates an extent to which it is possible to convert each one of the plurality of different media types into another, different one of the plurality of different media types; and an executing step to execute the selected one of the conversion instructions so as to automatically convert the first and/or second type information to one of the plurality of different media types that corresponds to the recipient's receiving mechanism.

242. A computer-readable medium according to claim 241, wherein the multimedia message includes the at least one page of mixed first and second type information, and further comprising a generating step to generate map information which identifies the first type and the second type information.

243. A computer-readable medium according to claim 242, wherein the multimedia message includes plural pages, and further comprising a generating step to generate link information among the plural pages.

244. A computer-readable medium according to claim 243, further comprising a storing step to store plural multimedia messages and to generate header information for each of said plural multimedia messages.

245. A computer-readable medium according to claim 244, further comprising an arranging step to arrange said plural multimedia messages into plural folders.

246. A computer-readable medium according to claim 241, further comprising a transmitting step to transmit the multimedia message.

247. A computer-readable medium according to claim 246, wherein the multimedia message is transmitted via a medium selected from the group consisting of a facsimile interface, a modem, and a voice telephone.

248. A computer-readable medium according to claim 246, further comprising a providing step to provide at least two transmission media different from each other for transmitting the multimedia message.

249. A computer-readable medium according to claim 248, wherein said at least two transmission media are a modem and a facsimile interface, respectively, and wherein said converting step converts text type information into image type information.

250. A computer-readable medium according to claim 248, wherein said at least two transmission media are a modem and a facsimile interface, respectively, and wherein said converting step converts image type information into text type information.

251. A computer-readable medium according to claim 249, further comprising a converting step to convert text type information into voice type information.

252. A computer-readable medium according to claim 246, further comprising a scheduling step to schedule transmission of the multimedia message.

253. A computer-readable medium according to claim 246, further comprising a receiving step to receive commands from a telephone interface and to process the commands so received.

254. A computer-readable medium according to claim 253, further comprising a transmitting step to transmit a multimedia message in accordance with the processed commands.

255. A computer-readable medium according to claim 253, wherein the commands are DTMF signals on the telephone interface.

256. A computer-readable medium according to claim 241, further comprising an inputting step to input first type information and second type information different from said first type information.

257. A computer-readable medium according to claim 256, wherein said first and second type information is input from a medium selected from the group consisting of a scanner, a video interface, a text keyboard and a microphone.

258. A computer-readable medium according to claim 241, further comprising a displaying step to display the multimedia message.

259. A computer-readable medium according to claim 258, further comprising an editing step to edit the multimedia message.

260. A computer-readable medium according to claim 259, further comprising an exchanging step to exchange information with a host computer and to edit the exchanged information.

261. A computer-readable medium according to claim 241, further comprising process steps to transmit the multimedia message to a plurality of recipients; and wherein, in a case that the multimedia message is to be transmitted to a plurality of recipients, the process steps further comprise:

a determining step to determine whether conversion of the first and/or second type information is necessary for each of the plurality of recipients based on the at least one stored media type; and a selecting step to select, in cases where conversion is necessary, one or more of the plurality of conversion instructions to automatically convert, for each of the plurality of recipients, the first and/or second type information into one of a plurality of different delivery media types that corresponds to the recipient's receiving mechanism.

262. A computer-readable medium according to claim 261, further comprising:

a storing step to store converted messages for each of the plurality of recipients in a message transmission queue; and a transmitting step to transmit each message stored in the message transmission queue to a recipient's receiving mechanism at a scheduled time.

263. A computer-readable medium which stores computer-executable process steps, the computer-executable process steps to transmit a multimedia message to a recipient, the computer-executable process steps comprising:

a first storing step to store at least one of a plurality of different media types which correspond to a receiving mechanism of the recipient, and to store a multimedia message having at least one page that includes first type information mixed with second type information different from the first type information such that the first and second types are separately identifiable;

a second storing step to store a plurality of different conversion instructions, each one of the conversion instructions for converting the first and second type information into a respective one of the plurality of different media types;

a determining step to determine whether conversion of the first and/or second types of information is required based on the at least one media type stored in the first storing step;

a selecting step to select, in a case that conversion is required, one of the plurality of different conversion instructions based on a table of permissible and impermissible conversion capabilities and based on the at least one media type stored in the first storing step, wherein the table of permissible and impermissible conversion capabilities indicates an extent to which it is possible to convert each one of the plurality of different media types into another, different one of the plurality of different media types;

an executing step to execute the selected one of the conversion instructions so as to automatically convert the first and/or second type information to one of the plurality of different media types that corresponds to the recipient's receiving mechanism; and a transmitting step to transmit the converted multimedia message to the recipient.

264. A computer-readable medium according to claim 263, wherein said multimedia message is transmitted via a medium selected from the group consisting of facsimile interface, a modem, and a voice telephone.

265. A computer-readable medium according to claim 263, further comprising a providing step to provide at least two transmission media different from each other for transmitting the stored multimedia message.

266. A computer-readable medium according to claim 265, wherein said at least two transmission media comprise a modem and a facsimile interface, respectively, and wherein said converting step converts text type information into image type information.

267. A computer-readable medium according to claim 266, further comprising a converting step to convert text type information into voice type information.

268. A computer-readable medium according to claim 265, wherein said at least two transmission media comprise a modem and a facsimile interface, respectively, and wherein said code to convert converts image type information into text type information.

269. A computer-readable medium according to claim 263, further comprising a scheduling step to schedule transmission of the multimedia message.

270. A computer-readable medium according to claim 263, further comprising a receiving step to receive commands from a telephone interface and to process the commands so received.

271. A computer-readable medium according to claim 270, further comprising a transmitting step to transmit a multimedia message in accordance with the processed commands.

272. A computer-readable medium according to claim 270, wherein the commands are DTMF signals on the telephone interface.

273. A computer-readable medium according to claim 263, wherein said storing step stores map information which identifies the first type information and the second type information in said at least one page.

274. A computer-readable medium according to claim 273, wherein said storing step stores multimedia messages comprising plural pages and also stores link information among the plural pages.

275. A computer-readable medium according to claim 274, wherein said storing step stores plural multimedia messages, and also stores header information for each of said plural multimedia messages.

276. A computer-readable medium according to claim 263, further comprising:

an inputting step to input first type information and second type information different from said first type information;

a processing step to process the first and second type information into a multimedia message; and a storing step to store the multimedia message.

277. A computer-readable medium according to claim 276, wherein said first and second type information is input via a medium selected from the group consisting of a scanner, a video interface, a text keyboard and a microphone.

278. A computer-readable medium according to claim 277, further comprising a displaying step to display the multimedia message.

279. A computer-readable medium according to claim 278, further comprising an editing step to edit the multimedia message.

280. A computer-readable medium according to claim 279, further comprising an exchanging step to exchange information with a host computer and to edit the exchanged information.

281. A computer-readable medium according to claim 263, further comprising process steps to transmit the multimedia message to a plurality of recipients; and wherein, in a case that the multimedia message is to be transmitted to a plurality of recipients, the process steps further comprise:

a determining step to determine whether conversion of the first and/or second type information is necessary for each of the plurality of recipients based on the at least one stored media type; and a selecting step to select, in cases where conversion is necessary, one or more of the plurality of conversion instructions to automatically convert, for each of the plurality of recipients, the first and/or second type information into one of a plurality of different delivery media types that corresponds to the recipient's receiving mechanism.

282. A computer-readable medium according to claim 281, further comprising:

storing step to store converted messages for each of the plurality of recipients in a message transmission queue; and a transmitting step to transmit each message stored in the message transmission queue to a recipient's receiving mechanism at a scheduled time.

283. A computer-readable medium which stores computer-executable process steps, the computer-executable process steps to send and receive multimedia messages, the computer-executable process steps comprising:

a first inputting step to input first type information;

a second inputting step to input second type information different from the first type information;

a first storing step to store at least one of a plurality of different media types which correspond to a receiving mechanism of the recipient, and to store a plurality of different conversion instructions, each one of the conversion instructions for converting the first and second type information into a respective one of the plurality of different media types;

a mixing step to mix the first type information and the second type information to generate a multimedia message in which the first type information and the second type information are separately identifiable;

a second storing step to store the multimedia message;

a determining step to determine whether conversion of the first and/or second types of information is required based on the at least one media type stored in the first storing step;

a selecting step to select, in a case that conversion is required, one of the plurality of different conversion instructions based on a table of permissible and impermissible conversion capabilities and based on the at least one media type stored in the first storing step, wherein the table of permissible and impermissible conversion capabilities indicates an extent to which it is possible to convert each one of the plurality of different media types into another, different one of the plurality of different media types;

an executing step to execute the selected one of the conversion instructions so as to automatically convert the first and/or second type information to one of the plurality of different media types that corresponds to the recipient's receiving mechanism;

a transmitting step to transmit the converted multimedia message to a transmission interface; and a receiving step to receive a multimedia message from the transmission interface, wherein the received multimedia message is stored.

284. A computer-readable medium according to claim 283, wherein the multimedia message includes at least one page of mixed first and second type information, further comprising a generating step to generate map information which identifies the first type information and the second type information and to store the map information.

285. A computer-readable medium according to claim 284, wherein the multimedia message includes plural pages, further comprising a generating step to generate link information among the plural pages and to store the link information.

286. A computer-readable medium according to claim 285, further comprising a generating step to generate header information for the multimedia message and to store the header information.

287. A computer-readable medium according to claim 286, further comprising a storing step to store received multimedia messages in a second folder.

288. A computer-readable medium according to claim 283, wherein said multimedia messages are transmitted over a medium selected from the group consisting of facsimile interface, a modem, and a voice telephone.

289. A computer-readable medium according to claim 283, further comprising a providing step to provide at least two transmission media different from each other for transmitting a stored multimedia message.

290. A computer-readable medium according to claim 289, wherein said at least two transmission media are a modem and a facsimile interface, respectively, and wherein said converting step converts text type information into image type information.

291. A computer-readable medium according to claim 289, wherein said at least two transmission media are a modem and a facsimile interface, respectively, and wherein said converting step converts image type information into text type information.

292. A computer-readable medium according to claim 290, further comprising a converting step to convert text type information into voice type information.

293. A computer-readable medium according to claim 283, further comprising a scheduling step to schedule transmission of the multimedia message.

294. A computer-readable medium according to claim 283, further comprising a receiving step to receive commands from a telephone interface and to process the commands so received.

295. A computer-readable medium according to claim 294, further comprising a transmitting step to transmit the stored multimedia message in accordance with the processed command.

296. A computer-readable medium according to claim 294, wherein the commands are DTMF signals on the telephone interface.

297. A computer-readable medium according to claim 283, wherein said first and second type information are input from a medium selected from the group consisting of a scanner, a video interface, a text keyboard and a microphone.

298. A computer-readable medium according to claim 297, further comprising a displaying step to display the multimedia message.

299. A computer-readable medium according to claim 298, further comprising an editing step to edit the multimedia message.

300. A computer-readable medium according to claim 299, further comprising an exchanging step to exchange information with a host computer and to edit the exchanged information.

301. A computer-readable medium according to claim 289, further comprising a connecting step to selectively connect the telephone interface to one of said at least two transmission media in accordance with message characteristics on the telephone interface.

302. A computer-readable medium according to claim 301, wherein said at least two transmission media are selected from the group consisting of a facsimile interface, a modem and a voice digitizer.

303. A computer-readable medium according to claim 283, further comprising process steps to transmit the multimedia message to a plurality of recipients; and wherein, in a case that the multimedia message is to be transmitted to a plurality of recipients, the process steps comprise:

a determining step to determine whether conversion of the first and/or second type information is necessary for each of the plurality of recipients based on the at least one stored media type; and a selecting step to select, in cases where conversion is necessary, one or more of the plurality of conversion instructions to automatically convert, for each of the plurality of recipients, the first and/or second type information into one of a plurality of different delivery media types that corresponds to the recipient's receiving mechanism.

304. A computer-readable medium according to claim 303, further comprising:

a storing step to store converted messages for each of the plurality of recipients in a message transmission queue; and a transmitting step to transmit each message stored in the message transmission queue to a recipient's receiving mechanism at a scheduled time.

305. A computer-readable medium which stores computer-executable process steps, the computer-executable process steps to handle a multimedia message, the computer-executable process steps comprising:

a first inputting step to input text information on a keyboard;

a second inputting step to input voice information through a microphone;

a third inputting step to input image information via a scanner;

a fourth inputting step to input binary information;

a mixing step to mix at least two of text information, voice information, image information, binary information and OLE information to generate a multimedia message in which the different types of information are separately identifiable;

a storing step to store the multimedia message comprising at least two of text information, voice information, image information, binary information and OLE information;

a step to send and to receive image information through a telephone interface, wherein, in a case that a recipient's receiving mechanism receives image information, one image-producing conversion routine is selected from among plural conversion routines and, using the selected image-producing conversion routine, each different type of information in the multimedia message is automatically converted to image information prior to sending the multimedia message, the selected image-producing conversion routine being selected based on a table of permissible and impermissible conversion capabilities, wherein the table of permissible and impermissible conversion capabilities indicates an extent to which it is possible to convert each one of the plurality of different information types into another, different one of the plurality of different information types;

a step to send and to receive voice information through a telephone interface, wherein, in a case that the recipient's receiving mechanism receives voice information, one voice-producing conversion routine is selected from among the plural conversion routines and, using the selected voice-producing conversion routine, each different type of information in the multimedia message is automatically converted to voice information prior to sending the multimedia message, the selected voice-producing conversion routine being selected based on the table of permissible and impermissible conversion capabilities;

a step to send and to receive image information, text information, voice information and binary information, mixed together in multimedia messages, through the telephone interface, wherein received multimedia messages are stored; and a connecting step to selectively connect the telephone interface to a facsimile interface, a voice synthesizer/digitizer, or a modem in accordance with the message characteristics.

306. A computer-readable medium according to claim 305, further comprising a generating step to generate map information which identifies the text information, the voice information, the image information, the binary information and the OLE information in a multimedia message.

307. A computer-readable medium according to claim 306, further comprising a generating step to generate link information among plural pages of a multimedia message.

308. A computer-readable medium according to claim 307, further comprising a generating step to generate header information for a multimedia message.

309. A computer-readable medium according to claim 305, further comprising a converting step to convert first type information into second type information.

310. A computer-readable medium according to claim 305, wherein text information is converted into image information.

311. A computer-readable medium according to claim 305, wherein said image information is converted into text information.

312. A computer-readable medium according to claim 311, wherein said text information is converted into voice information.

313. A computer-readable medium according to claim 305, further comprising a scheduling step to schedule transmission of the multimedia message.

314. A computer-readable medium according to claim 305, further comprising a receiving step to receive commands from the telephone interface.

315. A computer-readable medium according to claim 314, further comprising a transmitting step to transmit a multimedia message in accordance with the received commands.

316. A computer-readable medium according to claim 314, wherein the commands are received from the voice digitizer/synthesizer in the form of DTMF signals.

317. A computer-readable medium according to claim 305, further comprising a displaying step to display the multimedia message.

318. A computer-readable medium according to claim 317, further comprising an editing step to edit the multimedia message.

319. A computer-readable medium according to claim 318, further comprising an exchanging step to exchange information with a host computer and to edit the exchanged information.

320. A computer-readable medium according to claim 305, further comprising:
- a storing step to store each converted message in a message transmission queue; and
- a transmitting step to transmit each message stored in the message transmission queue to a recipient's receiving mechanism at a scheduled time.

* * * * *

UNITED STATES PATENT AND TRADEMARK OFFICE
CERTIFICATE OF CORRECTION

PATENT NO. : 5,802,314

DATED : September 1, 1998

INVENTORS : THOMAS S. TULLIS, et al.

It is certified that error appears in the above-identified patent and that said Letters Patent is hereby corrected as shown below:

On the title page, item [56]:
References Cited

OTHER PUBLICATIONS

Line 13 Change "IEE" to --IEEEE --.

COLUMN 1

Line 24, change "otherwise)" to --otherwise),--.

COLUMN 2

Line 26, change "in" to --such that--.

COLUMN 10

Line 10, change "is" to --are--.

COLUMN 11

Line 51, change "message" to messages--.

UNITED STATES PATENT AND TRADEMARK OFFICE
CERTIFICATE OF CORRECTION

PATENT NO. : 5,802,314

DATED : September 1, 1998

INVENTORS : THOMAS S. TULLIS, et al.

It is certified that error appears in the above-identified patent and that said Letters Patent is hereby corrected as shown below:

COLUMN 12

Line 21, change "selected" to --selected,--.

COLUMN 13

Line 22, change "message" to --messages--.

COLUMN 14

Line 9, change "selected" to --selected,--.

COLUMN 18

Line 7, change "message If" to --message.

If--.

Line 14, change "S1419" to --S1419,--.

COLUMN 25

Line 16, change "is" to --in--.

Line 30, change "stored" to --stored in--.

UNITED STATES PATENT AND TRADEMARK OFFICE
CERTIFICATE OF CORRECTION

PATENT NO. : 5,802,314

DATED : September 1, 1998

INVENTORS : THOMAS S. TULLIS, et al.

It is certified that error appears in the above-identified patent and that said Letters Patent is hereby corrected as shown below:

COLUMN 26

Line 33, change "mechanisms" to --mechanism--.

COLUMN 34

Line 62, change "messages" to --message--.

COLUMN 42

Line 29, change "messages" to --message--.

Signed and Sealed this

Sixth Day of July, 1999

Attest:

Q. TODD DICKINSON

Attesting Officer

Acting Commissioner of Patents and Trademarks